United States Patent
Oteri et al.

(10) Patent No.: US 12,137,452 B2
(45) Date of Patent: Nov. 5, 2024

(54) SEMI-STATIC HARQ-ACK CODEBOOK FOR MULTI-PDSCH TRANSMISSION

(71) Applicant: APPLE INC., Cupertino, CA (US)

(72) Inventors: Oghenekome Oteri, San Diego, CA (US); Chunhai Yao, Beijing (CN); Chunxuan Ye, San Diego, CA (US); Dawei Zhang, Cupertino, CA (US); Hong He, Cupertino, CA (US); Huaning Niu, Cupertino, CA (US); Seyed Ali Akbar Fakoorian, San Diego, CA (US); Sigen Ye, San Diego, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,406

(22) PCT Filed: Aug. 5, 2021

(86) PCT No.: PCT/CN2021/111012
§ 371 (c)(1),
(2) Date: Sep. 17, 2021

(87) PCT Pub. No.: WO2023/010454
PCT Pub. Date: Feb. 9, 2023

(65) Prior Publication Data
US 2024/0032030 A1  Jan. 25, 2024

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/0446* (2013.01); *H04W 72/232* (2023.01)

(58) Field of Classification Search
CPC ........... H04W 72/0446; H04W 72/232; H04W 72/1273; H04L 1/1812
(Continued)

(56) References Cited

FOREIGN PATENT DOCUMENTS

| CN | 112788760 A | 5/2021 |
|---|---|---|
| WO | WO-2023010454 A1 * | 2/2023 |

OTHER PUBLICATIONS

A (Year: 2000).*
(Continued)

*Primary Examiner* — Peter G Solinsky
(74) *Attorney, Agent, or Firm* — Dorsey & Whitney LLP

(57) ABSTRACT

Systems and methods for using hybrid automatic repeat request acknowledgement (HARQ-ACK) codebooks to as part of acknowledgement/negative acknowledgement (ACK/NACK) signaling regarding multiple physical downlink shared channel (PDSCH) transmissions (also termed "multi-PDSCH") scheduled by a single downlink control information (DCI) corresponding to multiple candidate PDSCH monitoring occasions are discussed herein. Rate matching indicators for one, multiple, or all of the PDSCHs of a scheduled multi-PDSCH are discussed. Effects of invalid symbol signaling, where one or more resources corresponding to a candidate PDSCH monitoring occasion corresponding to the DCI has been indicated for uplink (UL) use or not for DL use by a base station, are discussed. Effects of a bandwidth part change (in UL or downlink (DL)) occurring near or during the DCI, the multi-PDSCH, and a physical uplink control channel (PUCCH) containing the
(Continued)

ACK/NACK signaling (e.g., containing or corresponding to all or part of the HARQ-ACK codebook) are discussed.

20 Claims, 14 Drawing Sheets

(51) Int. Cl.
*H04W 72/0446* (2023.01)
*H04W 72/232* (2023.01)

(58) Field of Classification Search
USPC .......................................................... 370/329
See application file for complete search history.

(56) References Cited

OTHER PUBLICATIONS

CATT, "PDSCH/PUSCH enhancements for up to 71GHz operation", R1-2104509, 3GPP TSG RAN WG1 #105-e, e-Meeting, Agenda Item 8.2.5, May 19-27, 2021, 11 pages.
Moderator(LG Electronics), "Summary #1 of PDSCH/PUSCH enhancements (Scheduling/HARQ)", R1-21xxxxx, 3GPP TSG RAN WG1 #105-e, May 27, 2021.
PCT/CN2021/111012, International Search Report and Written Opinion, Mar. 28, 2022, 9 pages.
Qualcomm Incorporated, "Summary of Rel.15 maintenance for Scheduling and HARQ management", R1-1913269, 3GPP TSG RAN WG1 Meeting #99, Reno, Nevada, USA, Agenda Item 7.1.3, Nov. 18-22, 2019, 8 pages.

\* cited by examiner

| Index | (S,L) - 1 | (S,L) - 2 | (S,L) - 3 | (S,L) - 4 |
|---|---|---|---|---|
| 0 | (0,14) | (0,14) | - | - |
| 1 | (0,7) | (0,7) | - | - |
| 2 | (7,7) | (7,7) | - | - |
| 3 | (0,14) | (0,14) | (0,14) | (0,14) |
| 4 | (0,7) | (0,7) | (0,7) | (0,7) |
| 5 | (7,7) | (7,7) | (7,7) | (7,7) |

FIG. 2

SEMI-STATIC HARQ-ACK CODEBOOK FOR MULTI-PDSCH TRANSMISSION

TECHNICAL FIELD

This application relates generally to wireless communication systems, including details for generating hybrid automatic repeat request acknowledgement (HARQ-ACK) codebooks providing acknowledgement (ACK) and/or negative acknowledgment (NACK) signaling relative to multiple PDSCHs scheduled by a single DCI (multi-PDSCHs).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Note that in some systems, FR2 may also include frequency band from 52.6 GHz to 71 GHz (or beyond). Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates a TDRA table, according to an embodiment.

DETAILED DESCRIPTION

Figure 1:
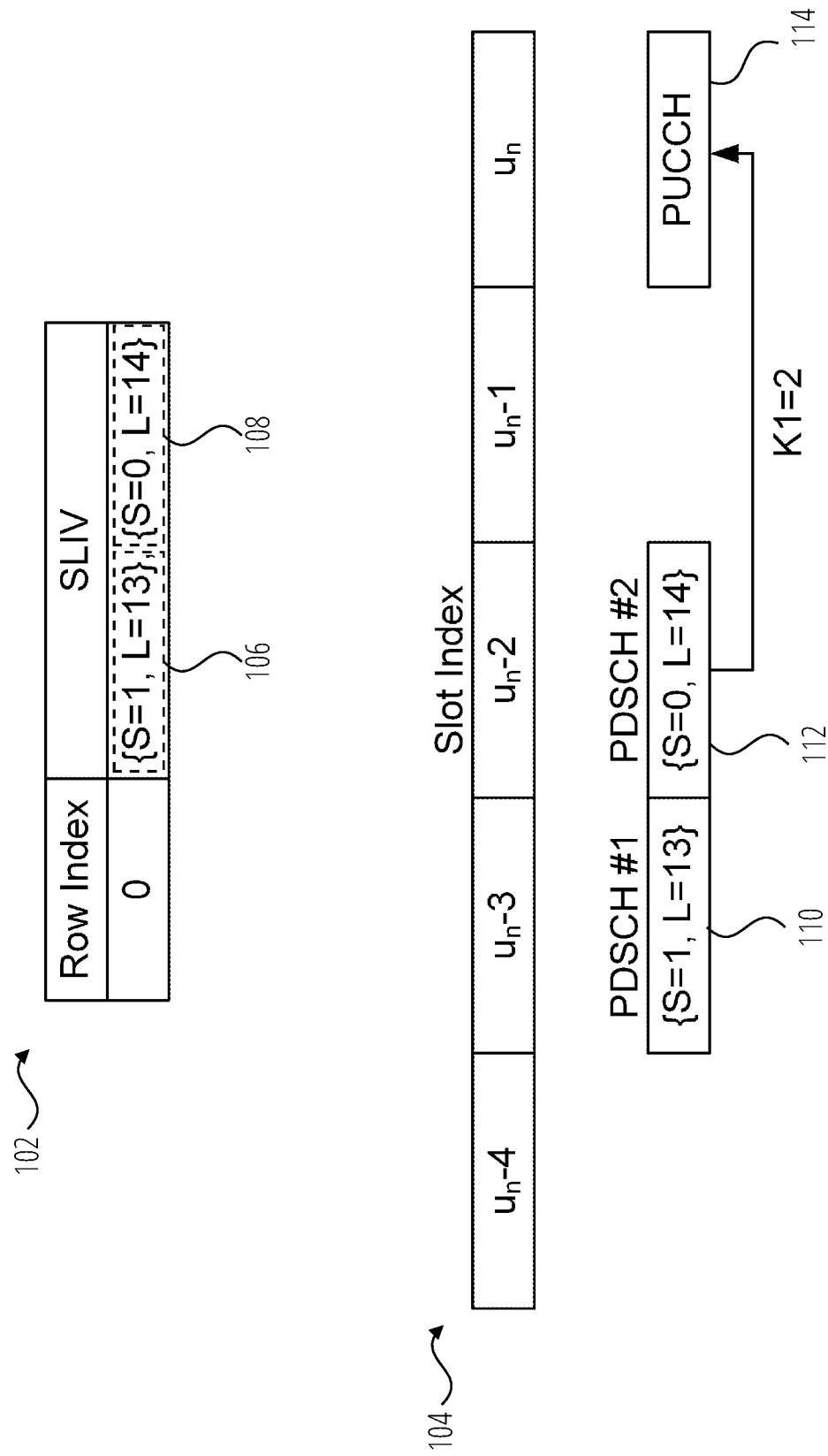
FIG. 1 illustrates a TDRA table defining candidate PDSCH reception occasions for multi-PDSCH, and a corresponding diagram of the result of the use of the TDRA table were single-PDSCH assumptions be merely extended to the multi-PDSCH case without any enhancement.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Physical downlink shared channels (PDSCHs) may be used in a RAN between a base station and a UE for downlink communications. In some RANs, PDSCHs may be scheduled by downlink control information (DCI) sent by the base station to a UE on a physical downlink control channel (PDCCH). In some wireless communications systems, a UE may be configured to indicate to a base station (e.g., provide feedback regarding) the receipt (or not) of any scheduled PDSCHs using a hybrid automatic repeat request acknowledgement (HARQ-ACK) codebook. Accordingly, it may be said that the UE provides acknowledgment/negative acknowledgment (ACK/NACK) feedback to the base station according to the HARQ-ACK codebook. Discussion herein relates to the scheduling of multiple PDSCHs by a single DCI. Herein, a set of multiple PDSCHs scheduled by a (single) DCI may be referred to as a "multi-PDSCH." Reference herein to the scheduling of "multiple PDSCH transmissions" may also reflect this idea.

In the case of multi-PDSCH, various options for generating a type-1 HARQ-ACK codebook providing feedback regarding the receipt (or not) of one or more PDSCH in a multi-PDSCH scheduled by a (single) DCI may be considered. In a first option, a set of candidate PDSCH reception occasions may be determined according to each start and length indicator value (SLIV) of each row in a time domain resource assignment (TDRA) table and based on an extension of a k1 set, where k1 values of the k1 set indicate a timing between the candidate PDSCH reception occasion and the HARQ-ACK codebook (e.g., in at least some cases, as between the slots for those items). The k1 set may include up to 8 k1 values, and may be informed to the UE in a PUCCH configuration parameter (e.g., a dl-DataToUL-ACK parameter) in DCI (e.g., DCI format 1_1). In subsets of this first option, a set of candidate PDSCH reception occasions may be determined according to each start and length indicator value (SLIV) of each row in a time domain resource assignment (TDRA) table (without using an extension of a k1 set). In a second option, a set of candidate PDSCH reception occasions is determined according to a last SLIV of each row of a TDRA table. Under one or more of these options, implications such as how to handle any collisions with time domain duplex (TDD) uplink (UL)/downlink (DL) configuration, whether and how to extend a k1 set based on k1 and a slot offset between the last PDSCH and other PDSCHs corresponding to a row of a TDRA table, etc., may be implicated.

Further, for a DCI that can schedule multi-PDSCHs, details regarding resource allocation related fields such as virtual resource block (VRB)-to-physical resource block (PRB) mapping, PRB bundling size indicator, rate matching indicator, and/or zero power (ZP) channel state information reference signal (CSI-RS) trigger may be implicated.

In systems that schedule PDSCHs singly (one PDSCH per scheduling DCI), the following procedure for generating a HARQ-ACK codebook corresponding to one or more rows of a TDRA table configuration (with each row indicating a single candidate PDSCH reception occasion) may be as follows. For each row of a TDRA table, a corresponding candidate PDSCH reception occasion is determined relative to a slot $u_n$ (where $u_n$ is the slot where the HARQ-ACK codebook is transmitted) by measuring back from $u_n$ by a k1 value currently under consideration. This information is determined relative to each row of the TDRA table to generate candidate PDSCH reception occasions corresponding to the TDRA table. This process may be repeated for more than one k1 value (if the applicable k1 set has more than one k1 value).

The overall set of the candidate PDSCH reception occasions so determined (e.g., corresponding to the use of the TDRA table with all k1 values) is pruned (e.g., duplicates as to the beginning of the candidate PDSCH monitoring occasion are removed). Then, HARQ-ACK bits are allocated in the codebook corresponding to each (unique, pruned) PDSCH reception occasion.

FIG. 1 illustrates a TDRA table 102 defining candidate PDSCH reception occasions for multi-PDSCH, and a corresponding diagram 104 of the result of the use of the TDRA table 102 were single-PDSCH assumptions be merely extended to the multi-PDSCH case without any enhancement or change. In other words, FIG. 1 illustrates why changing or enhancing the above procedure corresponding to single-PDSCH scheduling may be desirable in the event that the system is to use DCI to schedule multi-PDSCH. As shown, the (single) row of the TDRA table 102 includes a first SLIV 106 and a second SLIV 108, each respectively corresponding to a first PDSCH 110 and a second PDSCH 112 of a multi-PDSCH, as illustrated. A PUCCH 114 is to be used to send the HARQ-ACK codebook. It is also assumed that the relevant k1 set={2} (e.g., K1=2 in the illustrated example).

Following the above procedure for single PDSCH scheduling systems, measuring back by k1=2 slots from the slot of the PUCCH 114 (which is at slot $u_n$) ends up at slot $u_n$-2 (corresponding to the second PDSCH 112). Accordingly, the system would signal, in the HARQ-ACK codebook, for the candidate PDSCH reception occasion corresponding to the second PDSCH 112 (as determined using the second SLIV 108 of the TDRA table 102). However, no mechanism is provided to signal, in the HARQ-ACK codebook, for the candidate PDSCH reception occasion corresponding to the first PDSCH 110 (as determined using the first SLIV 106 of the TDRA table 102). Accordingly, different methods for various methods for generating HARQ-ACK codebooks for systems scheduling multi-PDSCH may be developed which are more comprehensive.

FIG. 2 illustrates a TDRA table 200, according to an embodiment. The TDRA table 200 includes multiple rows 202 that are indexed (e.g., such that a DCI can, during operation, indicate to a UE, via the index, that one or more PDSCH will be sent according to a configuration corresponding to the applicable row).

Each entry in the TDRA table 200 corresponds to one or more candidate PDSCH reception occasions (the location(s) of which are to be determined relative a slot $u_n$ having a corresponding PUCCH using a k1 value(s), in the manner described above). Each entry in the TDRA table 200 further defines a candidate PDSCH reception occasion using an S value and an L value. The S value may indicate the symbol of a slot corresponding to the candidate PDSCH reception occasion where the candidate PDSCH reception occasions begins, and the L value may indicate the length of that candidate PDSCH reception. For example, the S value 204 (with a value 0) may indicate that a candidate PDSCH reception occasion begins on symbol 0 of the corresponding slot (once determined), and the S value 206 (with the value 14) may inform that the candidate PDSCH reception occasion continues (from symbol 0) for 14 symbols.

Figure 3:
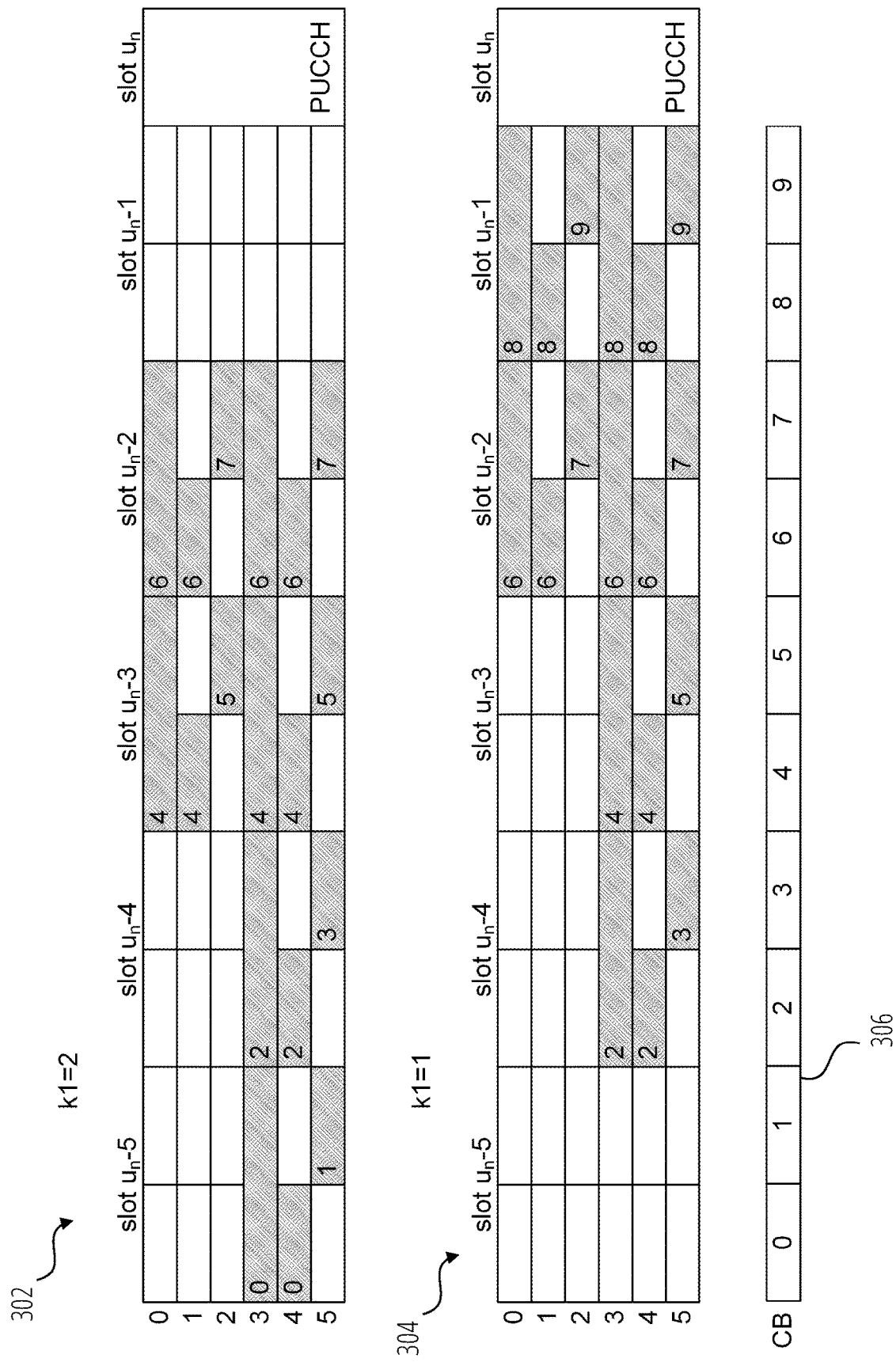
FIG. 3 illustrates a first visualized K1 table and a second visualized K1 table corresponding to a use of a first method for generating a HARQ-ACK codebook that takes into account the use of TDRA tables defining candidate PDSCH reception occasions for multi-PDSCH, according to an embodiment.

FIG. 3 illustrates a first visualized k1 table 302 and a second visualized k1 table 304 corresponding to a use of a first method for generating a HARQ-ACK codebook that takes into account the use of TDRA tables defining candidate PDSCH reception occasions for multi-PDSCH, according to an embodiment. The embodiment of FIG. 3 may assume the use of the TDRA table 200 of FIG. 2, and correspond to a K1 set of {2,1}. Accordingly, each of the first visualized k1 table 302 and the second visualized k1 table 304 are illustrated in terms of the TDRA table 200 of FIG. 2, with the first visualized k1 table 302 corresponding to the use of the TDRA table 200 with K1=2 and with the second visualized k1 table 304 corresponding to the use of the TDRA table 200 with K1=1. As seen in both examples, the PUCCH used to send the HARQ-ACK codebook is found in slot $u_n$.

The first method for generating a HARQ-ACK codebook that takes into account the use of TDRA tables defining candidate PDSCH reception occasions for multi-PDSCH then proceeds as follows. For each k1 value in the k1 set, the method determines the candidate PDSCH reception occasions for every row r in the TDRA table, with each such row scheduling PDSCH/multi-PDSCH, in the manner described above. The corresponding set of candidate PDSCH reception occasions for each row are identified by using the last SLIV entry in the row r in slot $u_n$–k1, and then working backward from there slot by slot until the beginning of the row r is reached. The process is then repeated for each row of the TRDA table. The first visualized k1 table 302 illustrates this in terms of the TDRA table 200 and with k1=2. The second visualized k1 table 304 illustrates this in terms of the TDRA table 200 and with k1=1.

This may be done in a manner such that HARQ-ACK bits for the candidate PDSCH reception occasions scheduled by one (or more) rows of the TDRA table can be multiplexed in the HARQ-ACK codebook that is eventually transmitted in slot $u_n$. For each k1, a set of the union of candidate PDSCH reception occasions (over all rows of the TDRA table) is generated. Then, all sets corresponding to the (possibly more than one) k1 values are merged together. Only unique candidate PDSCH reception occasions are kept (e.g., pruning, where duplicates as to the beginning of the candidate PDSCH monitoring occasion are removed). Then, HARQ-ACK bits for the set of unique (pruned) candidate PDSCH reception occasions are generated. The HARQ-ACK bits may be ordered according to ascending slot indices within the overall scheme. This is illustrated in FIG. 3 by the HARQ-ACK codebook 306, which contains one unique entry (e.g., bit) for each of the candidate PDSCH reception occasions (numbered 0-9) present in one or more of the first visualized k1 table 302 and the second visualized k1 table 304 (after the pruning of duplicates found in and across the first visualized k1 table 302 and the second visualized k1 table 304).

Figure 4:
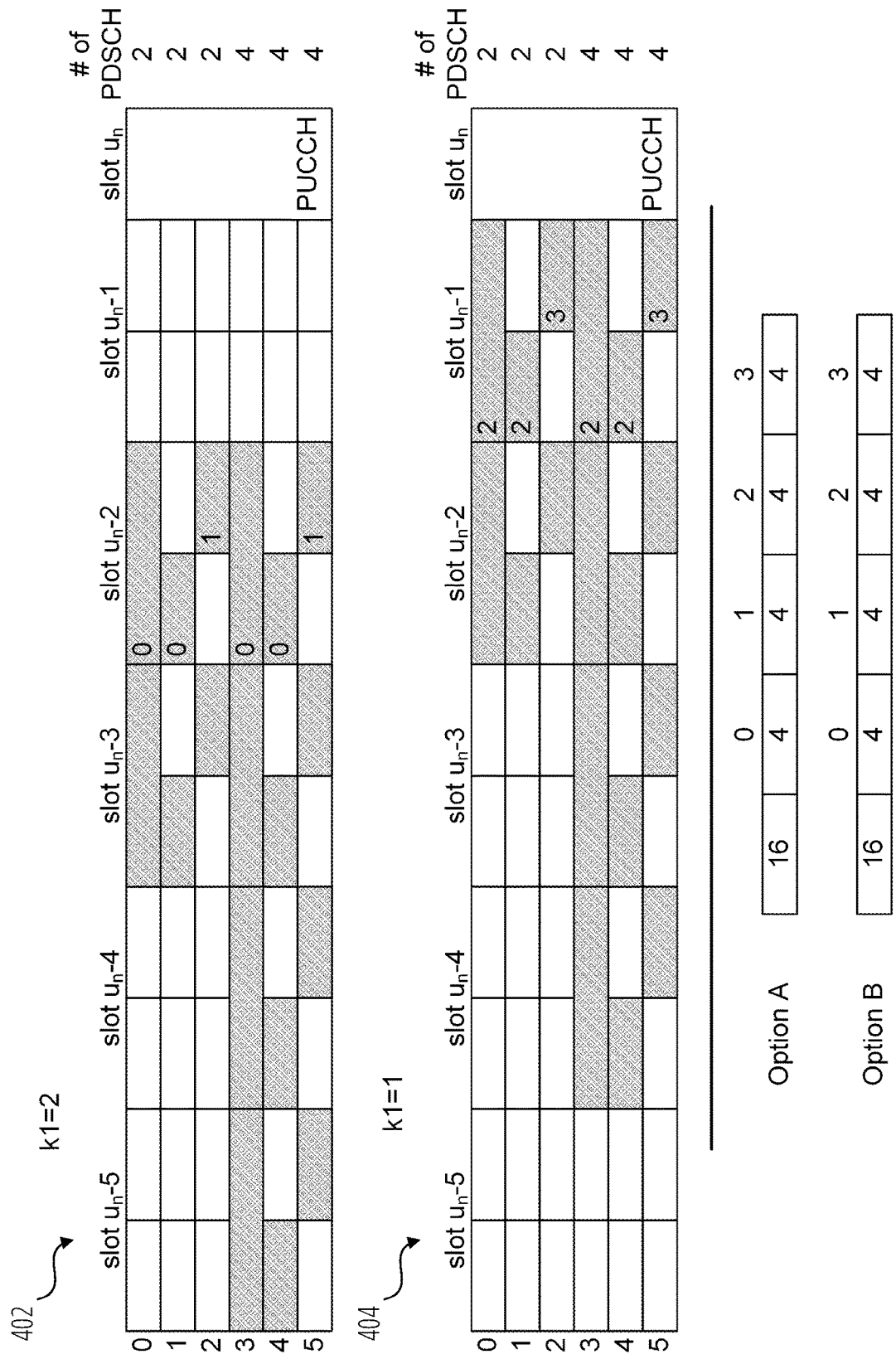
FIG. 4 illustrates a first visualized K1 table and a second visualized K1 table corresponding to a use of a second method for generating a HARQ-ACK codebook that takes into account the use of TDRA tables defining candidate PDSCH reception occasions for multi-PDSCH, according to an embodiment.

FIG. 4 illustrates a first visualized k1 table 402 and a second visualized k1 table 404 corresponding to a use of a second method for generating a HARQ-ACK codebook that takes into account the use of TDRA tables defining candidate PDSCH reception occasions for multi-PDSCH, according to an embodiment. The embodiment of FIG. 3 may assume the use of the TDRA table 200 of FIG. 2, and correspond to a K1 set of {2,1}. Accordingly, each of the first visualized k1 table 402 and the second visualized k1 table 404 are illustrated in terms of the TDRA table 200 of FIG. 2, with the first visualized k1 table 402 corresponding to the use of the TDRA table 200 with k1=2 and with the second visualized k1 table 404 corresponding to the use of the TDRA table 200 with k1=1. As seen in both examples, the PUCCH used to send the HARQ-ACK codebook is found in slot n.

The second method for generating a HARQ-ACK codebook that takes into account the use of TDRA tables defining candidate PDSCH reception occasions for multi-PDSCH then proceeds as follows. A HARQ-ACK window determination is made based on the configured k1 set. Then, candidate PDSCH reception occasions are determined within that HARQ-ACK window. In this method, the determination of the candidate PDSCH reception occasions is based on the last SLIV of each TDRA row of the table.

Then, HARQ-ACK information for each PDSCH candidate reception occasion is generated. The HARQ-ACK information of all PDSCHs scheduled by one DCI will be mapped relative to the candidate PDSCH reception occasion corresponding to the SLIV of the last scheduled PDSCH. For multi-PDSCH scheduling, multiple HARQ-ACK bits for multiple PDSCHs may be generated for mapping relative to that determined PDSCH candidate occasion. The number of HARQ-ACK bits (or reserved PDSCHs) mapped relative to that one candidate PDSCH reception occasion can then be determined by using the TDRA configuration (e.g., how many SLIVs are configured in the TDRA row with the last SLIV corresponding to the candidate PDSCH reception occasion) (in FIG. 4, Option A shows the per-candidate PDSCH reception occasion breakdown under this scheme), or by using the maximum number of PDSCHs that can be scheduled by a single DCI (in FIG. 4, Option B shows the per-candidate PDSCH reception occasion breakdown under this scheme).

It may be that in some systems, it is beneficial to define various parameter fields used by DCI capable of scheduling multi-PDSCH. Examples of fields that may need to be (re)defined to account for multi-PDSCH scheduling may include, for example, VRB-to-PRB mapping, a PRB bundling size indicator, a rate matching indicator, an a ZP CSI-RS trigger. It may be that for one or more of these, the DCI may set 1 single value for all PDSCHs, or it may set 1 value for each PDSCH, among other options. In cases involving the scheduling by the DCI of a multi-PDSCH, it may be the use of one parameter is beneficial for parameters that affect the multi-PDSCH transmission itself and/or for parameters that result from external factors on the multi-PDSCH.

A rate matching indicator may be applicable/used when reserved resources are configured for the slot of the PDSCH/candidate PDSCH reception occasion. The UE may in such cases assume that the corresponding PDSCH is rate matched around these resources. In some cases, the rate matching indicator may be 0, 1, or 2 bits.

In the case of the rate matching indicator, it may be that multiple parameter use is beneficial, as the required reserved resources may change over the duration of the multi-PDSCH transmission. In a first option, a single rate matching indicator is used for all PDSCHs in the multi-PDSCH. This rate matching indicator may be, for example, two bits.

In a second option, a rate matching indicator may be given on a per-PDSCH basis (e.g., a two bit rate matching indicator may be provided for each PDSCH of a multi-PDSCH, though it is also contemplated that a lower number (one) of bits may be used in some embodiments to save overhead).

In a third option, a new configuration of reserved resources for multi-PDSCH may be established to enable the definition of the duration of the multi-PDSCH transmission. In some systems, it may be that a symbolsInResourceBlock parameter (also discussed herein as "a symbols in resource block field") and/or a periodicityAndPattern parameter (also discussed herein as a "periodicity and pattern field") may be used to define or indicate the duration.

In a first case for a symbolsInResourceBlock parameter, the symbolsInResourceBlock parameter may define a maximum number of slots based on a maximum number of PDSCHs scheduled in DCI for a multi-PDSCH. For example, if the maximum number of PDSCHs in a multi-PDSCH scheduled by DCI is eight, a symbolsInResourceBlock parameter may be configured such that it can define a maximum of up to eight slots. In other embodiments, it may be that the PDSCHs are scheduled in non-contiguous slots, and therefore the symbolsInResourceBlock parameter may be configured such that it can define a number of slots that is greater than the number of PDSCHs. For example, when eight PDSCHs are transmitted with a one slot gap in between them, the symbolsInResourceBlock parameter may be configured such that it can define a maximum of up to 16 slots.

In a second case for a symbolsInResourceBlock parameter, the symbolsInResourceBlock parameter may define a maximum number of slots based on a subcarrier spacing (SCS) scaling. For example, for 120 kilohertz (kHz), a maximum number of slots may be two, for 480 kHz, a maximum number of slot may be eight, and for 960 kHz, a maximum number of slots may be 16, etc. In a third case for a symbolsInResourceBlock parameter, the symbolsInResourceBlock parameter may define a subset of values for a number of slots from an overall set of possible values. For example, the symbolsInResourceBlock parameter may define the subset {1, 2, 4, 8, 16} from the set {1, 2, 4, 8, 16, . . . , max}, where the maximum value is, for example, some power of two greater than 16.

In a first case of a periodicityAndPattern parameter, the periodicityAndPattern parameter may set to, for example, 40 bits for 120 kHz SCS, and this may be adjusted up to 320 bits for a 960 kHz SCS (e.g., linearly, according to SCS).

Figure 5:
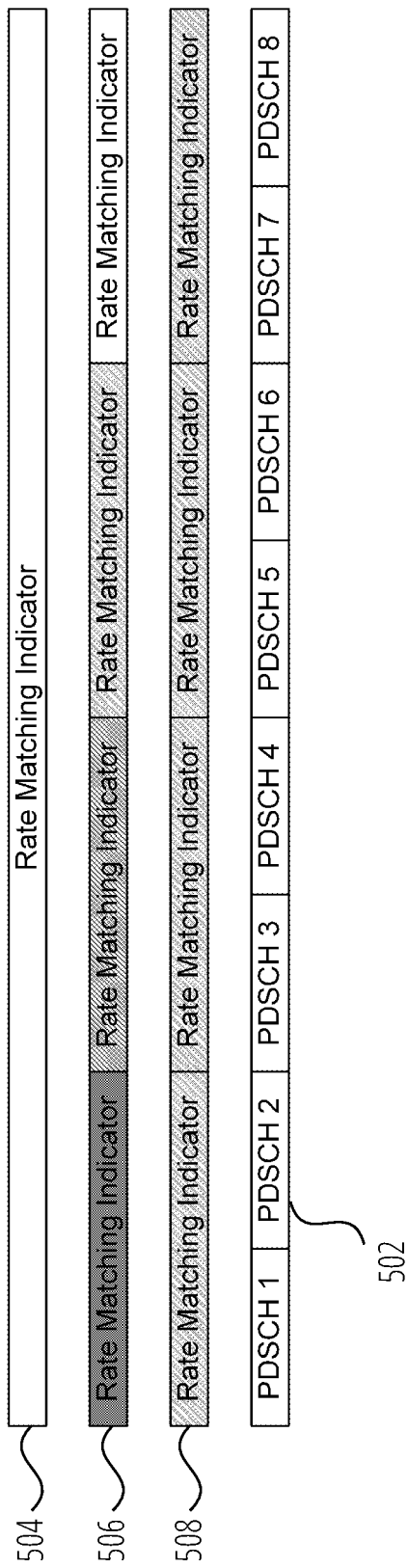
FIG. 5 illustrates various options for using one or more a rate monitoring indicator corresponding to a multi-PDSCH, according to an embodiment.

FIG. 5 illustrates various options 504, 506, 508 for using one or more a rate monitoring indicator corresponding to a multi-PDSCH 502, according to an embodiment. As illustrated, the multi-PDSCH 502 comprises eight PDSCHs.

In a first option 504, a single rate monitoring indicator applies to each PDSCH of the multi-PDSCH 502. In a second option 506, an individual rate monitoring indicator is associated with each illustrated pair of two PDSCHs from the multi-PDSCH 502, and the indications made by each such rate monitoring indicator are different. In a third option 508, an individual rate monitoring indicator is associated with each illustrated pair of two PDSCHs from the multi-PDSCH 502, and the indications made by each such rate monitoring indicator are the same. Rate monitoring indicators associated with more or less than two (e.g., one, three, five, etc.) PDSCHs in the multi-PDSCH could follow analogous configurations.

In some systems, tdd-UL-DL-Configuration signaling may be used. In such systems, the network may designate (e.g., in a tdd-UL-DL-ConfigurationCommon or a tdd-UL-DL-ConfigurationDedicated information element) one or more resources for use as an UL resource. For example, the network may set one or more symbols for use as UL symbols.

In some systems, invalid symbol pattern configurations may be used. For example, the gNB may configure the UE with an invalid symbol pattern (e.g., invalidSymbolPatternDL for PDSCH and invalidSymbolPatternUL for PUSCH) that indicates which symbols are not usable for DL or UL transmission, respectively.

Accordingly, it may be the case that a symbol is set to UL via a tdd-UL-DL-Configuration, and/or that a symbol is not useable for DL according to, for example, an invalidSymbolPatternDL configuration. In such cases, there may be a conflict where one or more candidate PDSCH reception occasions overlaps with such a symbol (with the conflict being due to the fact that such a symbol should not actually be used for PDSCH transmission by the base station for being set to UL/indicated unusable for DL, as the case may be). Herein, any such symbols which overlap or intersect with one or more PDSCH reception occasions may be discussed as "invalid symbols."

It may be beneficial to deterministically handle such cases. Multiple methods are considered. For example, it may be that indications (e.g., bits) in a HARQ-ACK codebook corresponding to candidate PDSCH monitoring occasion(s) that overlap or intersect with invalid symbols are kept in the HARQ-ACK codebook are set to NACK. In other cases, it may be that indications corresponding to candidate PDSCH monitoring occasions that overlap or intersect with invalid symbols are omitted from (or are removed altogether from) the HARQ-ACK codebook (resulting in a smaller HARQ-ACK codebook). This may be in recognition of the fact that both the UE and the base station know (due to the UL configuration of the invalid slot) that a PDSCH will not be sent by the base station in that candidate PDSCH monitoring occasion, and thus there is no need to use resources to make an indication for that candidate PDSCH monitoring occasion. These methods may be appropriate for Type 1, Type 2, or Type 3 codebooks.

It may also be beneficial to deterministically handle other HARQ-related issues for PDSCH, such as HARQ process numbering. In a first case involving invalid symbol overlap with a candidate PDSCH monitoring occasion, the HARQ process numbering is incremented (as a virtual PDSCH). In a second case involving invalid symbol overlap with a candidate PDSCH monitoring occasion, the HARQ process number is skipped. These methods may also be appropriate for Type 1, Type 2, or Type 3 codebooks.

Details of methods according to the method described in FIG. 3 for handling the case where, for example, a tdd-UL-DL-Configuration setting UL resources is provided to the UE, or where an invalidSymbolPatternDL configuration indicating symbols unusable for DL is provided to the UE, and at least one symbol of a candidate PDSCH monitoring occasion derived from one (or more) rows r in a TDRA is accordingly an invalid symbol, will now be discussed.

In a first case, it may be that the PDSCH(s) corresponding to the invalid symbol(s) are not transmitted by the base station (nor are they expected by the UE), as described above. In such a case, it may be that the indication(s) for the associated, overlapped candidate PDSCH monitoring occasion(s) (e.g., the PDSCH monitoring occasions for SLIV(s) that are overlapped with the invalid symbol(s)) are omitted from, or are removed from, the codebook altogether (e.g., are removed from the set of PDSCH monitoring occasions that are used to generate the HARQ-ACK codebook).

Figure 6:
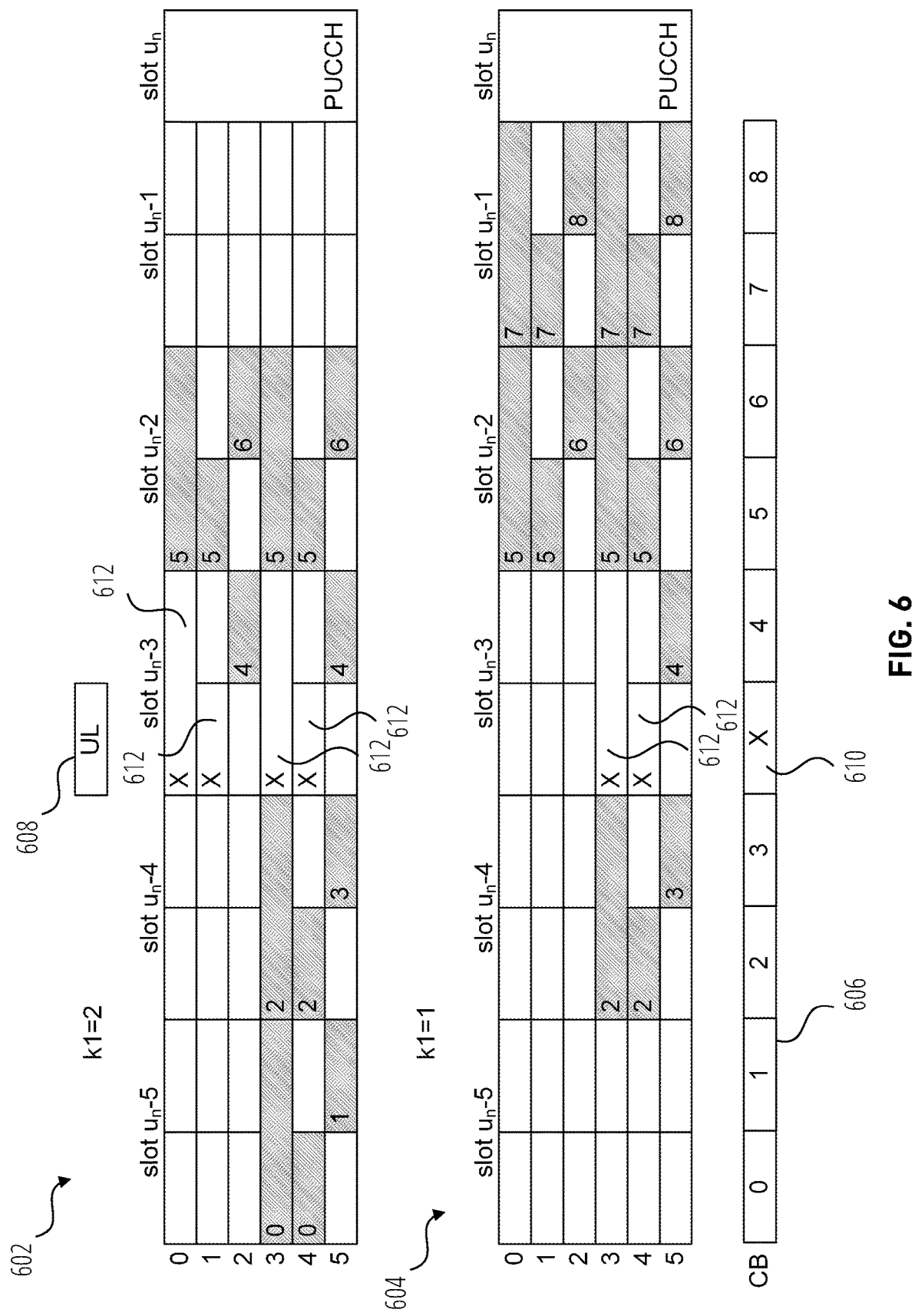
FIG. 6 illustrates a first visualized K1 table and a second visualized K1 table corresponding to a use of a method for generating a HARQ-ACK codebook that takes into account the use of TDRA tables defining candidate PDSCH reception occasions for multi-PDSCH and the presence of one or more invalid symbols, according to an embodiment.

FIG. 6 illustrates a first visualized k1 table 602 and a second visualized k1 table 604 corresponding to a use of a method for generating a HARQ-ACK codebook that takes into account the use of TDRA tables defining candidate PDSCH reception occasions for multi-PDSCH and the presence of one or more invalid symbols 608, according to an embodiment. The embodiment of FIG. 6 may correspond to the embodiment of FIG. 3 (e.g., uses the method described in relation to FIG. 3, based on the TDRA table 200 of FIG. 2), with further adjustment to account for the invalid symbols 608. As illustrated, the invalid symbols 608 have been, for example, indicated for UL by tdd-UL-DL-Configuration signaling and/or indicated not useable for DL by an invalidSymbolPatternDL configuration. Accordingly, the portion 610 of the HARQ-ACK codebook 606 that would have otherwise corresponded to the overlapped candidate PDSCH monitoring occasions 612 (having the illustrated "X", illustrated prior to pruning) is not included in the HARQ-ACK codebook 606 (either by omission or removal). In other words, as compared to the HARQ-ACK codebook 306 of FIG. 3 (which is illustrated with 10 HARQ-ACK bits), the HARQ-ACK codebook 606 for FIG. 6 may only include nine HARQ-ACK bits.

In a second case, it may be that an overlapped candidate PDSCH monitoring occasion can still be used (in the manner described in relation to FIG. 3) by rate-matching any PDSCH sent on that candidate PDSCH monitoring occasion around any invalid symbols. However, if the code rate falls below a pre-defined or configured level, or the number of symbols is less than a predefined or configured threshold, the PDSCH may be dropped by the base station.

Figure 7:
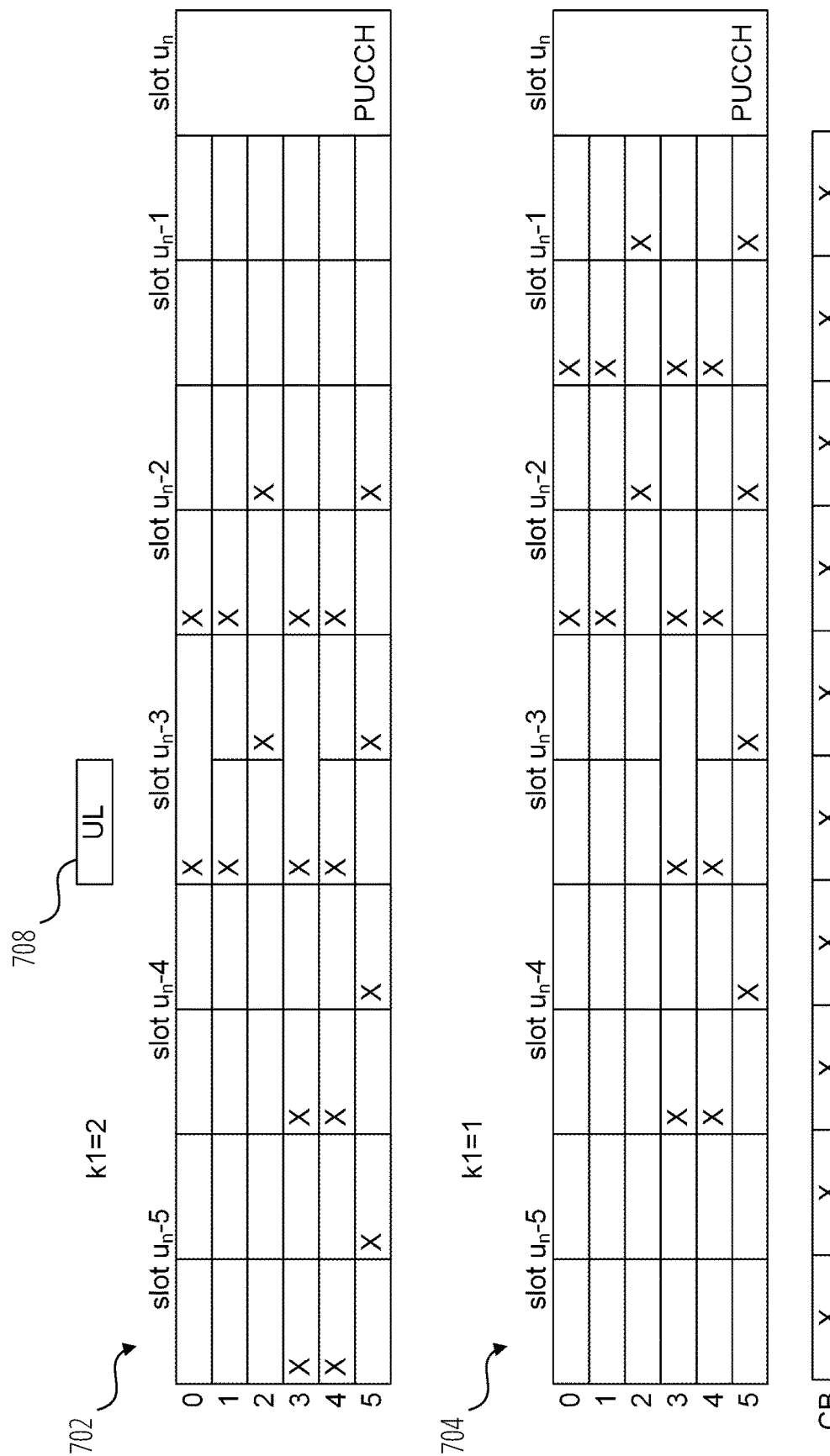
FIG. 7 illustrates a first visualized K1 table and a second visualized K1 table corresponding to a use of a method for generating a HARQ-ACK codebook that takes into account the use of TDRA tables defining candidate PDSCH reception occasions for multi-PDSCH and the presence of one or more invalid symbols, according to an embodiment.

FIG. 7 illustrates a first visualized k1 table 702 and a second visualized k1 table 704 corresponding to a use of a method for generating a HARQ-ACK codebook that takes into account the use of TDRA tables defining candidate PDSCH reception occasions for multi-PDSCH and the presence of one or more invalid symbols 708, according to an embodiment. In a third case (corresponding to FIG. 3), it may be that an entire multi-PDSCH transmission is not sent. Further, the UE may also determine not to send the HARQ-ACK codebook 706 at all, and/or the UE may remove all indications in the HARQ-ACK codebook corresponding to the set of candidate PDSCH reception occasions from the HARQ-ACK codebook (as illustrated with the "Xs" populating the HARQ-ACK codebook 706).

In a fourth case, all candidate PDSCH monitoring occasions are indicated for in the HARQ-ACK codebook. In such a case, an indication (e.g., in the ACK/NACK feedback associated with/of the HARQ-ACK codebook) for any candidate PDSCH monitoring occasion that overlaps with an invalid symbol may be set to NACK (e.g., a corresponding bit may be set to zero). Such indications may be said to correspond to a "virtual PDSCH."

Details of methods according to the method described in FIG. 4 for handling the case where, for example, a tdd-UL-DL-Configuration setting UL resources is provided to the UE, or where an invalidSymbolPatternDL configuration indicating symbols unusable for DL is provided to the UE, and at least one symbol of a candidate PDSCH monitoring occasion derived from one (or more) rows r in a TDRA is accordingly an invalid symbol, will now be discussed.

Figure 8:
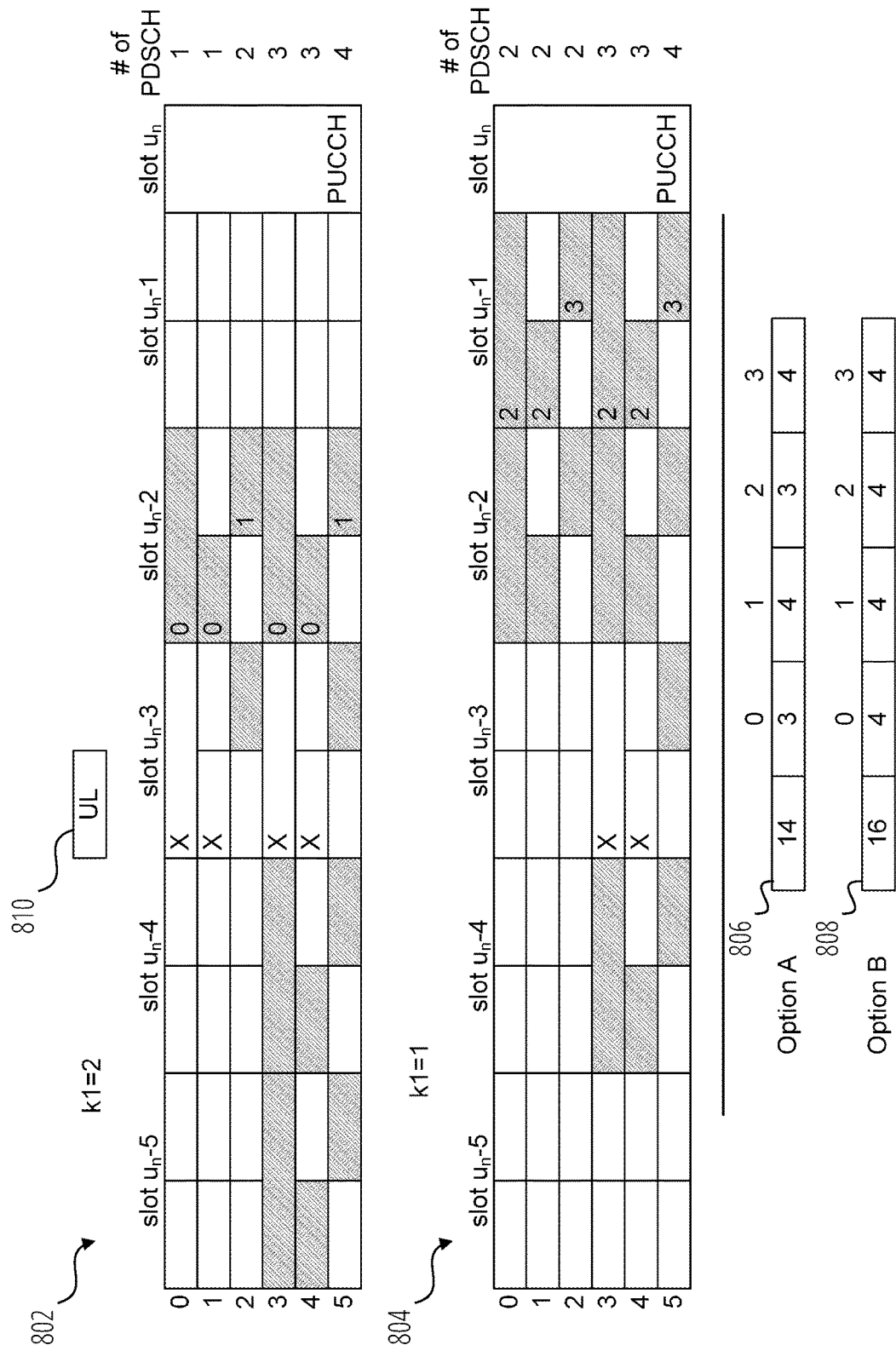
FIG. 8 illustrates a first visualized K1 table and a second visualized K1 table corresponding to a use of a method for generating a HARQ-ACK codebook that takes into account the use of TDRA tables defining candidate PDSCH reception occasions for multi-PDSCH and the presence of one or more invalid symbols, according to an embodiment.

FIG. 8 illustrates a first visualized K1 table 802 and a second visualized K1 table 804 corresponding to a use of a method for generating a HARQ-ACK codebook that takes into account the use of TDRA tables defining candidate PDSCH reception occasions for multi-PDSCH and the presence of one or more invalid symbols 810, according to an embodiment. In a first case, the candidate PDSCH monitoring occasion corresponding to the last SLIV in the row is kept in the codebook (corresponding to a virtual PDSCH) and is set to NACK even if intersecting with invalid symbol(s). Candidate PDSCH monitoring occasions corresponding to other SLIVs are not included in the HARQ-ACK codebook (either by omission or removal) if they intersect invalid symbols. This first case may correspond to the result found in option A 806 illustrated in FIG. 8.

In a second case, it may be that an overlapped candidate PDSCH monitoring occasion can still be used (in the manner described in relation to FIG. 4) by rate-matching any PDSCH sent on that candidate PDSCH monitoring occasion around any invalid symbols. However, if the code rate falls below a pre-defined or configured level, or the number of symbols is less than a predefined or configured threshold, the PDSCH may be dropped by the base station.

In a third case, all candidate PDSCH monitoring occasions are indicated for in the HARQ-ACK codebook. In such a case, an indication for any candidate PDSCH monitoring occasion that overlaps with an invalid symbol may be set to NACK (e.g., the corresponding bit may be set to zero). Such indications may be said to correspond to a "virtual PDSCH." This second case may correspond to the result found in option B 808 illustrated in FIG. 8.

It may be (in cases of DCI scheduling single PDSCH) that a wireless communication system is configured to omit the reporting of the scheduled PDSCH in the case that an uplink slot $n_u$ used to report the feedback for the single PDSCH starts at a same time or after a slot for an active DL bandwidth part (BWP) change on a serving cell 'c' or an active UL BWP change on a primary cell (PCell) and slot floor $((n_u-k_{1,k})*2^{\mu_{DL}-\mu_{UL}})+n_D$ (where $k_{1,k}$ is the relevant k1 value, $\mu_{DL}$ is a subcarrier spacing for a DL transmission, $\mu_{UL}$ is a subcarrier spacing for UL transmission, and $n_D$ is an index of a slot for DL transmission) is before the slot for the active DL BWP change on the serving cell c or the active UL BWP change on the PCell.

In some instances involving multi-PDSCH, it may be possible that bandwidth part (BWP) change occurs on a cell during or near the DCI scheduling the multi-PDSCH, the multi-PDSCH itself (e.g., in between PDSCH of the multi-PDSCH), and/or the PUCCH containing the related HARQ-ACK codebook. In such cases, it may be beneficial to determine how such a temporally relevant BWP change may affect the construction of the HARQ-ACK codebook for multi-PDSCH transmission. It may also be beneficial to determine how a BWP change may affect the multi-PDSCH transmission itself.

Figure 9:
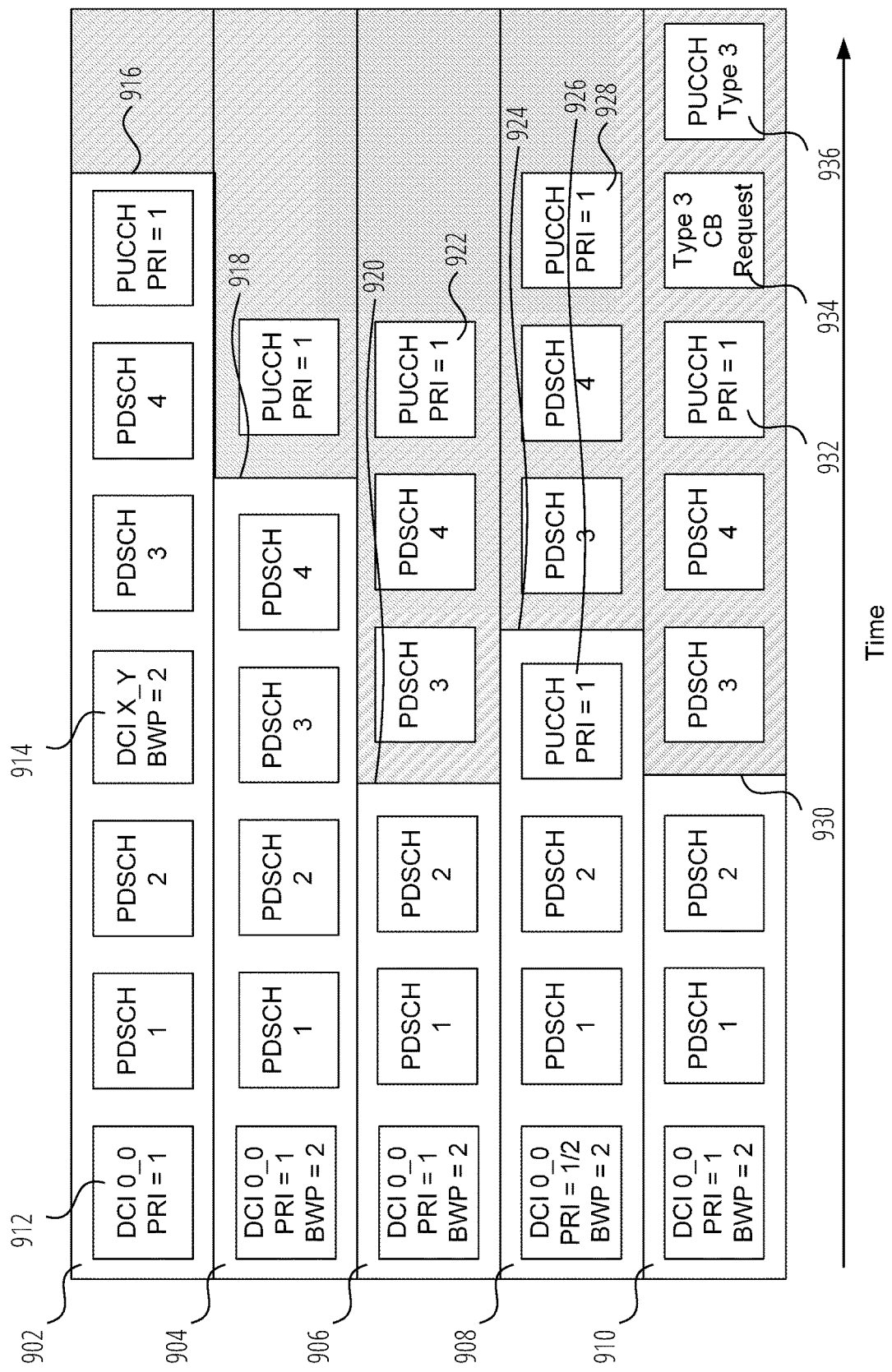
FIG. 9 illustrates a plurality of examples of handling cases of a BWP change from a first BWP to a second BWP as related to multi-PDSCH methods, according to various embodiments.

FIG. 9 illustrates a plurality of examples 902 through 910 of handling cases of a BWP change from a first BWP to a second BWP as related to multi-PDSCH methods, according to various embodiments. Each of the examples 902 through 910 illustrate one or more DCI scheduling a multi-PDSCH and specifying the use of multiple BWP, the PDSCHs of the scheduled multi-PDSCH, and a PUCCH that includes a HARQ-ACK codebook reporting ACK/NACK data regarding each PDSCH of the multi-PDSCH. In each of the examples 902 through 910 illustrated in FIG. 9, a white background may represent a first BWP and a grey background may represent a second BWP. Accordingly, the elements of each example 902 to 910 of FIG. 9 placed on the white background may be understood to have been transmitted using a first BWP is active, while the elements of each example 902 to 910 of FIG. 9 placed on the grey background may be understood to have been transmitted when a second BWP is active.

Note that the first example 902 illustrates a case where a first DCI 912 schedules a multi-PDSCH (e.g., using the illustrated PUCCH resource indicator (PRI) field) and a second DCI 914 indicates for a BWP switch. The second example 904, third example 906, fourth example 908, and fifth example 910 each use a single DCI having both of these items of information. It should be understood that the use of one or multiple DCI in this manner could be applied to any of the first example 902, second example 904, third example 906, fourth example 908, or fifth example 910.

In some cases, the UE may not expect an UL or DL BWP change 916 on the serving cell after a DCI scheduling the multi-PDSCH transmission is received, at least until after such a time that the corresponding PUCCH is transmitted. For example, in the first example 902, the DCI transmission, the entire multi-PDSCH transmission, and the transmission of the HARQ-ACK codebook happens within a single BWP, as illustrated. In these cases the HARQ-ACK codebook construction may be as previously discussed above (e.g., as in cases not expressly related to BWP changes discussed above).

In other cases, the UE may expect that an UL or DL BWP may occur on the serving cell at some time after the DCI scheduling the multi-PDSCH transmission but prior to a corresponding PUCCH. The second example 904, the third example 906, the fourth example 908, and the fifth example 910 are examples according to these cases.

In the second example 904, the UE may not expect an UL or DL BWP change 918 on the serving cell to occur after the DCI scheduling the multi-PDSCH transmission until the PDSCH corresponding to the last SLIV of the row r of the TRDA table used to schedule the multi-PDSCH has been transmitted. In some of these cases, the UE may send HARQ-ACK bits (e.g., for ACK/NACK feedback) acting as if/assuming that all the HARQ-ACK bits were sent in the current BWP (this may be appropriate when using a codebook as described in FIG. 4 above). If there is a change in SCS for the DL/UL BWP, the duration of k0 (the offset between the DL slot having the DCI performing PDSCH scheduling and the scheduled PDSCH) and/or k1 is at least the same as the duration of k1 in the original BWP.

In the third example 906, the fourth example 908, and the fifth example 910, the UE may expect a UL or DL BWP change on the serving cell may occur after the DCI scheduling the multi-PDSCH transmission. In these examples, the UE may further expect that such a BWP change may occur, for example, within the PDSCHs of the multi-PDSCH. In these embodiments, the maximum number and type of UL/DL BWP change(s) may be set by UE capability.

The third example 906 illustrates that the BWP change 920 occurs between PDSCHs of the multi-PDSCH. In the third example 906, the UE sends the HARQ-ACK bits (e.g., for ACK/NACK feedback) for the PDSCHs of both BWPs in the PUCCH 922 (e.g., the UE assumes/acts as if all the HARQ-ACK bits were sent in the current BWP). If there is a change in SCS for the DL/UL BWP, the duration of k1 is at least the same as the duration of k1 in the original BWP.

The fourth example 908 illustrates that the BWP change 924 occurs between PDSCHs of the multi-PDSCH. In the fourth example 908, the UE may send HARQ-ACK bits (e.g., for ACK/NACK feedback) for effective k1 values occurring before the BWP change 924 (e.g., representing a first portion of the HARQ-ACK codebook for the entire multi-PDSCH) in a first PUCCH 926 configured to be sent in the first BWP, and will send HARQ-ACK bits for k1 values occurring after the BWP change (e.g., representing a second portion of the HARQ-ACK codebook for the entire multi-PDSCH) in a second PUCCH 928 configured to be sent in the second BWP. In other words, the UE will send HARQ-ACK bits (e.g., for ACK/NACK feedback) of the HARQ-ACK codebook in each of a PUCCH respectively corresponding to each BWP.

The fifth example 910 illustrates that the BWP change 924 occurs between PDSCHs of the multi-PDSCH. In the 910, the UE may send HARQ-ACK bits (e.g., for ACK/NACK feedback) for k1 values occurring after the BWP change 930 (e.g., representing a second (in time) portion of the HARQ-ACK codebook for the entire multi-PDSCH) in a first PUCCH 932, and expect that the base station may request for the HARQ-ACK bits for k1 values occurring prior to the BWP change 930 (e.g., representing a first (in time) portion of the HARQ-ACK codebook for the entire multi-PDSCH). This request may occur as a type 3 request 934, as illustrated. The UE may then send the second PUCCH 936 in response to the type 3 request 934. In such cases, the HARQ-ACK codebook may be referred to as a "type 3 codebook."

In some wireless communications systems using DCI that schedule PDSCH singly, it may be that when k0=0, the value of k1 is measured relative to an actual start of a monitoring occasion MO for the PDCCH transmitting the HARQ-ACK codebook (rather than, e.g., the beginning of the slot having that PDCCH). This behavior may be configured using a referenceOfSLIVDCI-1-2 parameter. In such cases, there may be no support for PDSCH mapping Type A or cross-carrier scheduling. Note also that in such cases, entries using k0>0 may also be included in the TDRA table, but these may correspond to a measurement (according to k1) made relative to the slot boundary of the slot for the corresponding PDCCH, regardless of any referenceOfSLIVDCI-1-2 setting.

It may be beneficial to deterministically handle the use of a referenceOfSLIVDCI-1-2 parameter in the case of DCI that schedule multi-PDSCH. Specifically, it may be beneficial to define how the use of a referenceOfSLIVDCI-1-2 parameter may affect the HARQ-ACK codebook in such cases. Note that such cases may also apply to DCI that schedule multiple physical uplink shared channel transmissions (multi-PUSCH). Accordingly, when discussing the effects of the referenceOfSLIVDCI-1-2 parameter, the term "PxSCH" and/or "multi-PxSCH" may be used, which refers to the concept that the discussed idea relates to either PDSCH, PUSCH, multi-PDSCH and/or a multi-PUSCH, as applicable.

In a first option, in a case of a multi-PxSCH, it may be that the use of a referenceOfSLIVDCI-1-2 is not supported.

In a second option, in a case of a multi-PxSCH, it may be that the use of a referenceOfSLIVDCI-1-2 is supported. In such cases, the UE may identify the entries in the TRDA table with at least one SLIV having a k0=0. Then, for each entry in the k1 set, at an applicable PUCCH, the UE identifies the slot that will both correspond to k0=0 and overlap with a PDCCH monitoring occasion with a starting symbol (S0) in the slot greater than 0 (S0>0). Then, for the specific SLIV, if S+S0+L≤14 and S0>0, or if S+S0+L≤14 for normal cyclic prefix and S+S0+L≥12 for extended cyclic prefix, the UE adds a new entry to the row with S as S+S0.

In cases involving DCI scheduling multi-PDSCH, it may be beneficial to use a determined method for generating the semi-static HARQ-ACK codebook that accounts for changes from the case of DCI that singly schedule PDSCHs. In one example of such a method, for each serving cell of the UE a slot $n_u$ having a PUCCH including the HARQ-ACK codebook is determined. In such cases, each k1 value used in the method be taken from either an extended k1 set or an original k1 set. For entries in the TDRA table, the UE may remove invalid symbols (e.g., in cases such as those discussed above where candidate PDSCH monitoring occasions that overlap or intersect with invalid symbols are omitted from, or are removed altogether from, a HARQ-ACK codebook). Further, the UE may remove symbols in non-valid BWPs (e.g., in cases non-current BWPs are not valid, similarly to various cases discussed above). In such cases, the UE may consider harq-ACKSpatialBundling-PUCCH, PDSCH-CodeBlockGroupTransmission, and PDSCH-CodeBlockGrouTrasnmission to define HARQ bits. Further, the UE may consider the use of harq-ACK-timeBundlingPUCCH.

Figure 10:
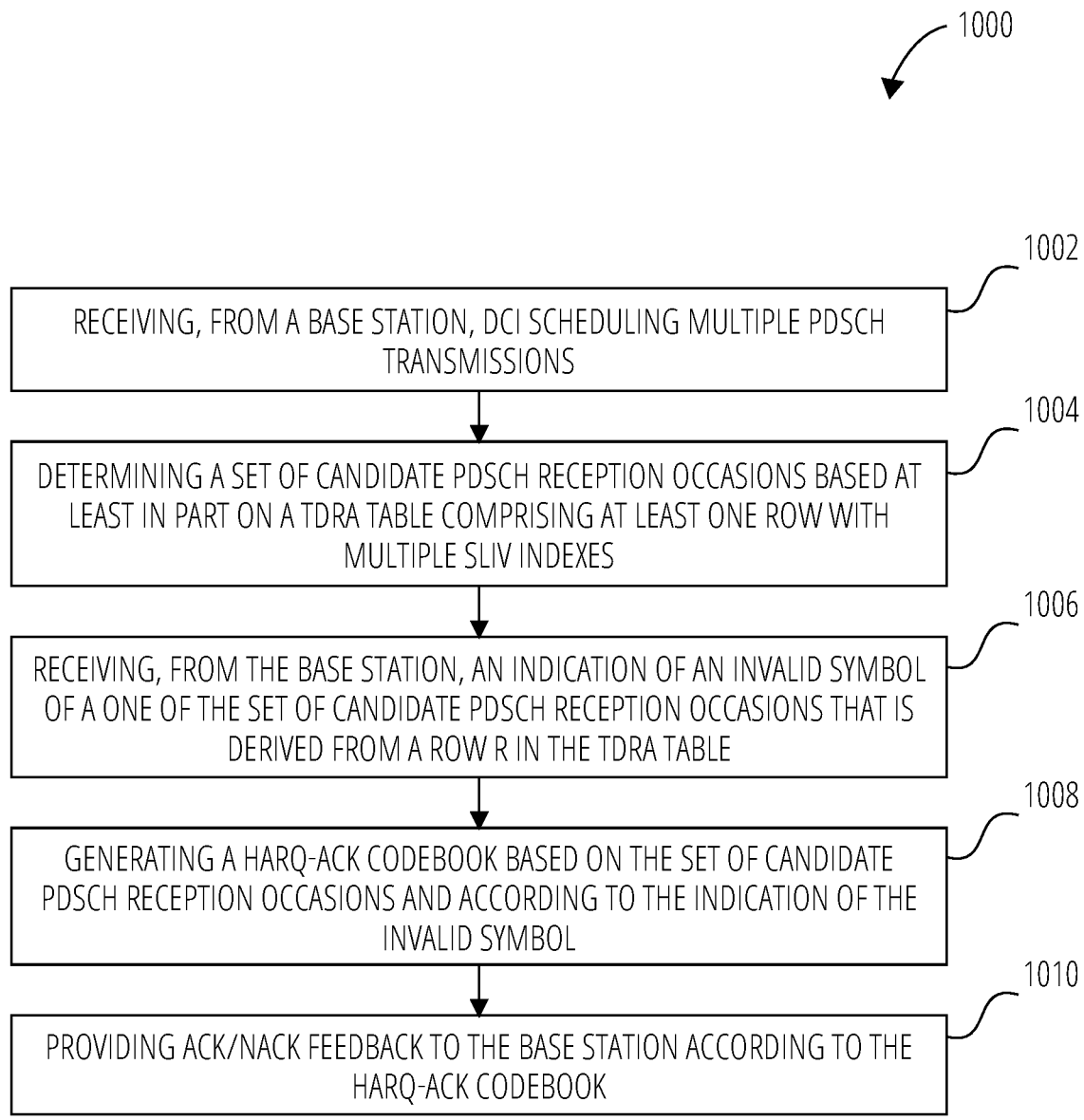
FIG. 10 illustrates a method for wireless communications by a UE, according to an embodiment.

FIG. 10 illustrates a method 1000 for wireless communications by a UE, according to an embodiment. The method 1000 includes receiving 1002, from a base station, DCI scheduling multiple PDSCH transmissions.

The method 1000 further includes determining 1004 a set of candidate PDSCH reception occasions based at least in part on a TDRA table comprising at least one row with multiple SLIV indexes.

The method 1000 further includes receiving 1006, from the base station, an indication of an invalid symbol of a one of the set of candidate PDSCH reception occasions that is derived from a row r in the TDRA table;

The method 1000 further includes generating 1008 a HARQ-ACK codebook based on the set of candidate PDSCH reception occasions and according to the indication of the invalid symbol.

The method 1000 further includes providing 1010 ACK/NACK feedback to the base station according to the HARQ-ACK codebook.

In some embodiments of the method 1000, receiving the indication of the invalid symbol comprises receiving time division duplexing-uplink-downlink-configuration (tdd-UL-DL-Configuration) signaling indicating that the invalid symbol is set to uplink (UL).

In some embodiments of the method 1000, receiving the indication of the invalid symbol comprises receiving an invalid symbol pattern configuration indicating that the invalid symbol is not useable for DL.

In some embodiments of the method 1000, generating the HARQ-ACK codebook comprises removing the one of the set of candidate PDSCH reception occasions from the set of candidate PDSCH reception occasions prior to generating the HARQ-ACK codebook.

Some embodiments of the method 1000 further include receiving a PDSCH that has been rate-matched around the invalid symbol in the one of the set of candidate PDSCH reception occasions.

Some embodiments of the method 1000 further include removing all indications in the HARQ-ACK codebook corresponding to the set of candidate PDSCH reception occasions from the HARQ-ACK codebook.

Some embodiments of the method 1000 further include setting a portion of the ACK/NACK feedback corresponding to the one of the set of candidate PDSCH reception occasions to NACK.

Embodiments contemplated herein include an apparatus comprising means to perform one or more elements of the method 1000. This apparatus may be, for example, an apparatus of a UE (such as a wireless device 1402 that is a UE, as described herein).

Embodiments contemplated herein include one or more non-transitory computer-readable media comprising instructions to cause an electronic device, upon execution of the instructions by one or more processors of the electronic device, to perform one or more elements of the method 1000. This non-transitory computer-readable media may be, for example, a memory of a UE (such as a memory 1406 of a wireless device 1402 that is a UE, as described herein).

Embodiments contemplated herein include an apparatus comprising logic, modules, or circuitry to perform one or more elements of the method 1000. This apparatus may be, for example, an apparatus of a UE (such as a wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the method 1000. This apparatus may be, for example, an apparatus of a UE (such as a wireless device 1402 that is a UE, as described herein).

Embodiments contemplated herein include a signal as described in or related to one or more elements of the method 1000.

Embodiments contemplated herein include a computer program or computer program product comprising instructions, wherein execution of the program by a processor is to cause the processor to carry out one or more elements of the method 1000. The processor may be a processor of a UE (such as a processor(s) 1404 of a wireless device 1402 that is a UE, as described herein). These instructions may be, for example, located in the processor and/or on a memory of the UE (such as a memory 1406 of a wireless device 1402 that is a UE, as described herein).

It is contemplated that complimentary steps to those described in relation to the method 1000 could be performed by a base station in communication with a UE performing the method 1000. For example, the base station may generate and/or send a DCI scheduling the multi-PDSCH to the UE, generate and/or send the multi-PDSCH according to that scheduling, send the UE a tdd-UL-DL-Configuration signaling and/or an invalid symbol pattern configuration, and/or to process ACK/NACK signaling (e.g., according to a HARQ-ACK codebook) received in a PUCCH from the UE. It is also contemplated that the base station may perform any rate-matching of a PDSCH as described above.

Figure 11:
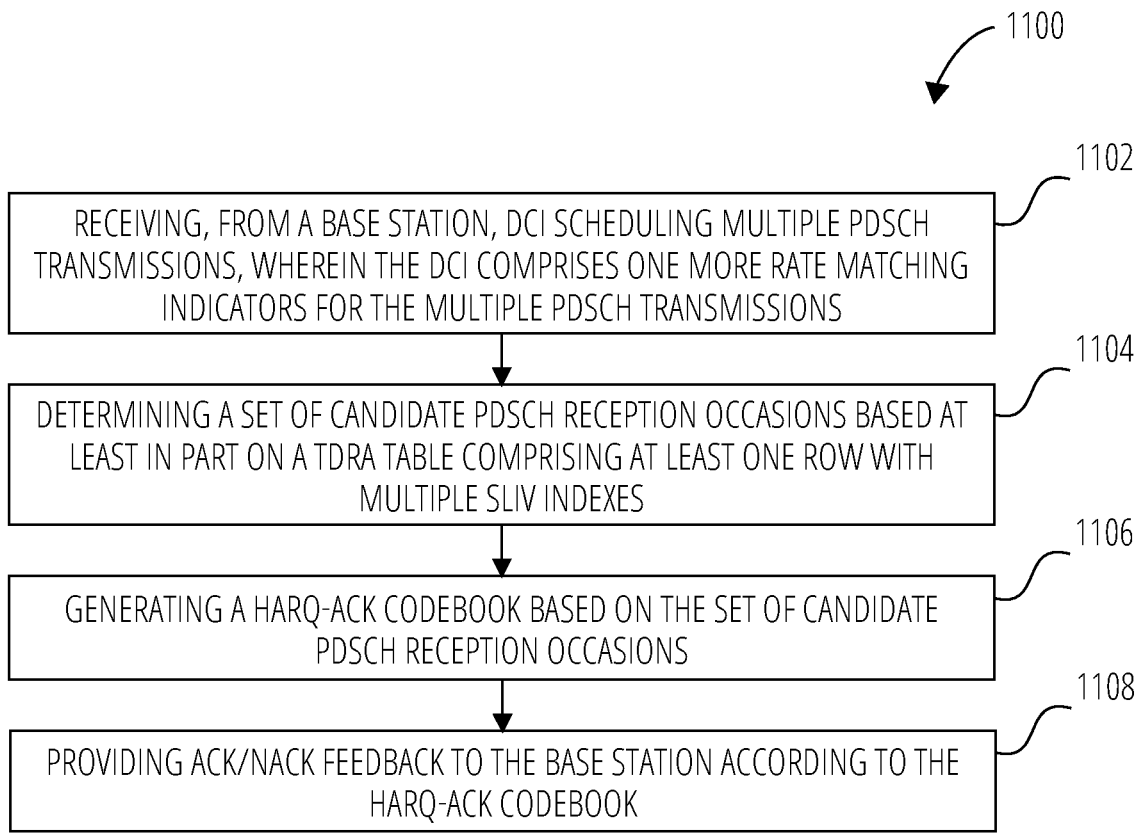
FIG. 11 illustrates a method for wireless communications by a UE, according to an embodiment.

FIG. 11 illustrates a method 1100 for wireless communications by a UE, according to an embodiment. The method 1100 includes receiving 1102, from a base station, DCI scheduling multiple PDSCH transmissions, wherein the DCI comprises one more rate matching indicators for the multiple PDSCH transmissions.

The method 1100 further includes determining 1104 a set of candidate PDSCH reception occasions based at least in part on a TDRA table comprising at least one row with multiple SLIV indexes.

The method 1100 further includes generating 1106 a HARQ-ACK codebook based on the set of candidate PDSCH reception occasions.

The method 1100 further includes providing 1108 ACK/NACK feedback to the base station according to the HARQ-ACK codebook.

In some embodiments of the method 1100, the one or more rate matching indicators comprises a single rate matching indicator that is applicable to each of the multiple PDSCH transmissions.

In some embodiments of the method 1100, the one or more rate matching indicators comprises a plurality of rate matching indicators corresponding to respective PDSCHs of the multiple PDSCH transmissions. In some of these embodiments, the plurality of rate matching indicators each comprises a single bit.

In some embodiments, the method 1100 further includes receiving, from the base station, an indication of a duration of the multiple PDSCH transmissions, wherein the one or more rate matching indicators comprises a rate matching indicator corresponding to reserved resources for the duration of the multiple PDSCH transmissions. In some such embodiments, the indication of the duration comprises a symbols in resource block field defining a maximum number of slots based on a maximum number of PDSCHs scheduled by the DCI. In some such embodiments, the indication of the duration comprises a symbols in resource block field defining a maximum number of slots based on SCS scaling. In some such embodiments, the indication of the duration comprises a symbols in resource block field defining a subset of values. In some such embodiments, the indication of the duration comprises a periodicity and pattern parameter set to 40 bits for 120 kHz and set up to 320 bits for 960 kHz.

Embodiments contemplated herein include an apparatus comprising means to perform one or more elements of the method 1100. This apparatus may be, for example, an apparatus of a UE (such as a wireless device 1402 that is a UE, as described herein).

Embodiments contemplated herein include one or more non-transitory computer-readable media comprising instructions to cause an electronic device, upon execution of the instructions by one or more processors of the electronic device, to perform one or more elements of the method 1100. This non-transitory computer-readable media may be, for example, a memory of a UE (such as a memory 1406 of a wireless device 1402 that is a UE, as described herein).

Embodiments contemplated herein include an apparatus comprising logic, modules, or circuitry to perform one or more elements of the method 1100. This apparatus may be, for example, an apparatus of a UE (such as a wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the method 1100. This apparatus may be, for example, an apparatus of a UE (such as a wireless device 1402 that is a UE, as described herein).

Embodiments contemplated herein include a signal as described in or related to one or more elements of the method 1100.

Embodiments contemplated herein include a computer program or computer program product comprising instructions, wherein execution of the program by a processor is to cause the processor to carry out one or more elements of the method 1100. The processor may be a processor of a UE (such as a processor(s) 1404 of a wireless device 1402 that is a UE, as described herein). These instructions may be, for example, located in the processor and/or on a memory of the UE (such as a memory 1406 of a wireless device 1402 that is a UE, as described herein).

It is contemplated that complimentary steps to those described in relation to the method 1100 could be performed by a base station in communication with a UE performing the method 1100. For example, the base station may generate and/or send a DCI (having one or more rate matching indicators) scheduling the multi-PDSCH to the UE, generate and/or send the multi-PDSCH according to that scheduling, and/or to process ACK/NACK signaling (e.g., according to a HARQ-ACK codebook) received in a PUCCH from the UE.

It is also contemplated that the base station may send the UE an indication of a duration of the multiple PDSCH transmissions in the form of a symbols in resource block field or parameter and/or a periodicity and pattern field or parameter.

Figure 12:
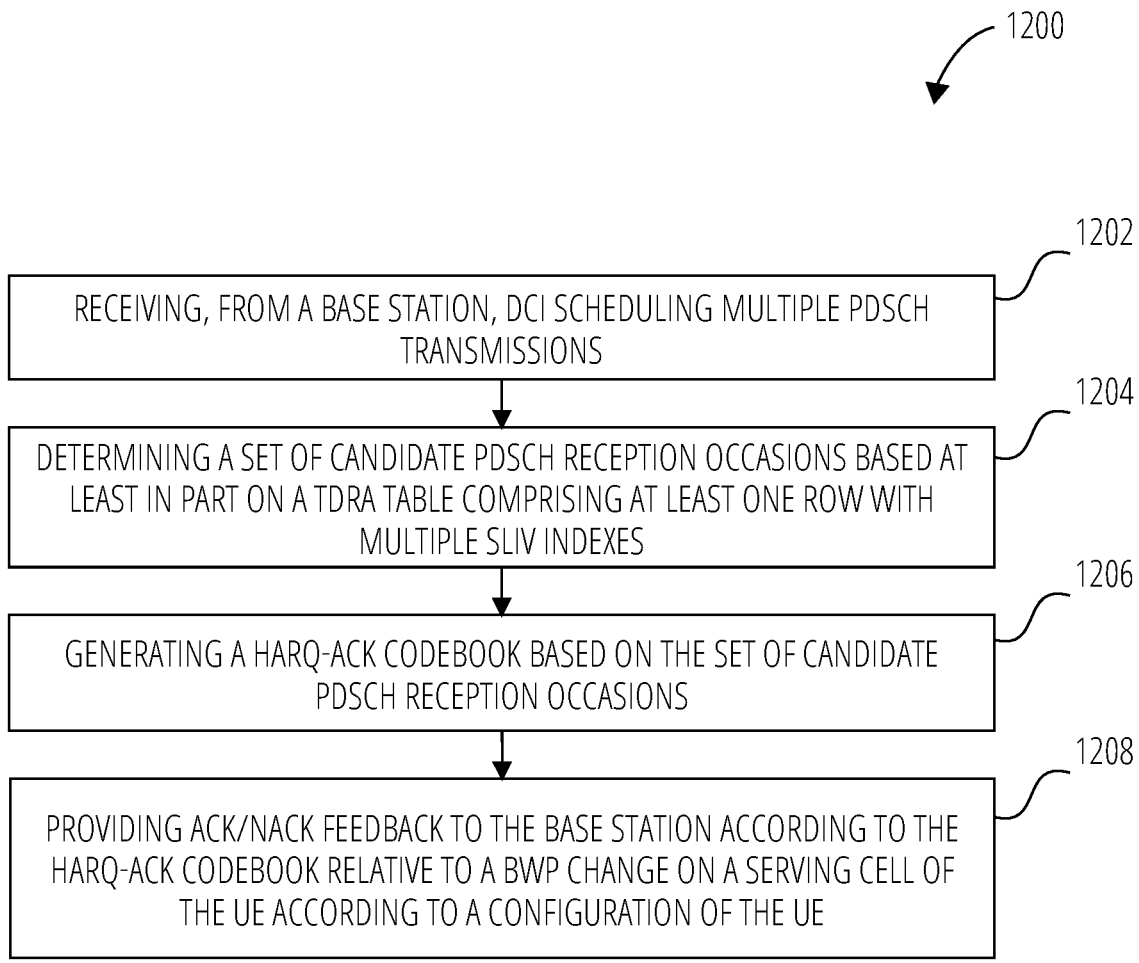
FIG. 12 illustrates a method for wireless communications by a UE, according to an embodiment.

FIG. 12 illustrates a method 1200 for wireless communications by a UE, according to an embodiment. The method 1200 includes receiving 1202, from a base station, DCI scheduling multiple PDSCH transmissions.

The method 1200 further includes determining 1204, a set of candidate PDSCH reception occasions based at least in part on a TDRA table comprising at least one row with multiple SLIV indexes.

The method 1200 further includes generating 1206 a HARQ-ACK codebook based on the set of candidate PDSCH reception occasions.

The method 1200 further includes providing 1208 ACK/NACK feedback to the base station according to the HARQ-ACK codebook relative to a BWP change on a serving cell of the UE according to a configuration of the UE.

In some embodiments of the method 1200, the UE does not expect the BWP change on the serving cell after the DCI schedules the multiple PDSCH transmissions until a PUCCH comprising the HARQ-ACK codebook is transmitted.

In some embodiments of the method 1200, the UE does not expect the BWP change on the serving cell after the DCI schedules the multiple PDSCH transmissions until a last PDSCH corresponding to a last SLIV associated with the multiple SLIV indexes has been transmitted. Some such embodiments further include sending, from the UE to the base station, the ACK/NACK feedback assuming that all HARQ-ACK bits of the HARQ-ACK codebook correspond to a current BWP.

In some embodiments of the method 1200, the UE expects the BWP change on the serving cell after the DCI schedules the multiple PDSCH transmissions. In some such embodiments, the BWP change is one of a maximum number and type of BWP changes that is based on UE capability information. Second cases of such embodiments further include sending, from the UE to the base station, the ACK/NACK feedback assuming that all HARQ-ACK bits of the HARQ-ACK codebook correspond to a current BWP, wherein for a change in SCS a duration of a k1 value is at least the same as a previous K1 value of a previous BWP, wherein the K1 value corresponds to an offset between a PDSCH occasion and a PUCCH comprising the HARQ-ACK codebook. Third cases of such embodiments further include sending, from the UE to the base station, first HARQ-ACK bits for effective k1 values after the BWP change, wherein the effective k1 values correspond to respective offsets between PDSCH occasions and a PUCCH comprising the HARQ-ACK codebook. In some of these third cases, the method 1200 also further includes sending, from the UE to the base station, second HARQ-ACK bits for other k1 values before the BWP change in the PUCCH configured before the BWP change. In some of these modified third cases, the method 1200 also further includes receiving, from the base station, a request for the second HARQ-ACK bits before the BWP change.

Embodiments contemplated herein include an apparatus comprising means to perform one or more elements of the method 1200. This apparatus may be, for example, an apparatus of a UE (such as a wireless device 1402 that is a UE, as described herein).

Embodiments contemplated herein include one or more non-transitory computer-readable media comprising instructions to cause an electronic device, upon execution of the instructions by one or more processors of the electronic device, to perform one or more elements of the method 1200. This non-transitory computer-readable media may be, for example, a memory of a UE (such as a memory 1406 of a wireless device 1402 that is a UE, as described herein).

Embodiments contemplated herein include an apparatus comprising logic, modules, or circuitry to perform one or more elements of the method 1200. This apparatus may be, for example, an apparatus of a UE (such as a wireless device 1402 that is a UE, as described herein).

Embodiments contemplated herein include an apparatus comprising: one or more processors and one or more computer-readable media comprising instructions that, when executed by the one or more processors, cause the one or more processors to perform one or more elements of the method 1200. This apparatus may be, for example, an apparatus of a UE (such as a wireless device 1402 that is a UE, as described herein).

Embodiments contemplated herein include a signal as described in or related to one or more elements of the method 1200.

Embodiments contemplated herein include a computer program or computer program product comprising instructions, wherein execution of the program by a processor is to cause the processor to carry out one or more elements of the method 1200. The processor may be a processor of a UE (such as a processor(s) 1404 of a wireless device 1402 that is a UE, as described herein). These instructions may be, for example, located in the processor and/or on a memory of the UE (such as a memory 1406 of a wireless device 1402 that is a UE, as described herein).

It is contemplated that complimentary steps to those described in relation to the method 1200 could be performed by a base station in communication with a UE performing the method 1200. For example, the base station may generate and/or send a DCI scheduling the multi-PDSCH to the UE, generate and/or send the multi-PDSCH according to that scheduling, and/or to process ACK/NACK signaling (e.g., according to a HARQ-ACK codebook) received in a PUCCH from the UE.

Further, the base station may perform these and other actions according to the expectations of the UE as these have been described in relation to the method 1200. For example, the base station may be configured to receive a first PUCCH in a first BWP and a second BWP in a second BWP. Alternatively, the base station may be configured to send a type 3 request to a UE in order to receive a (second) PUCCH in a (e.g., second) BWP.

Figure 13:
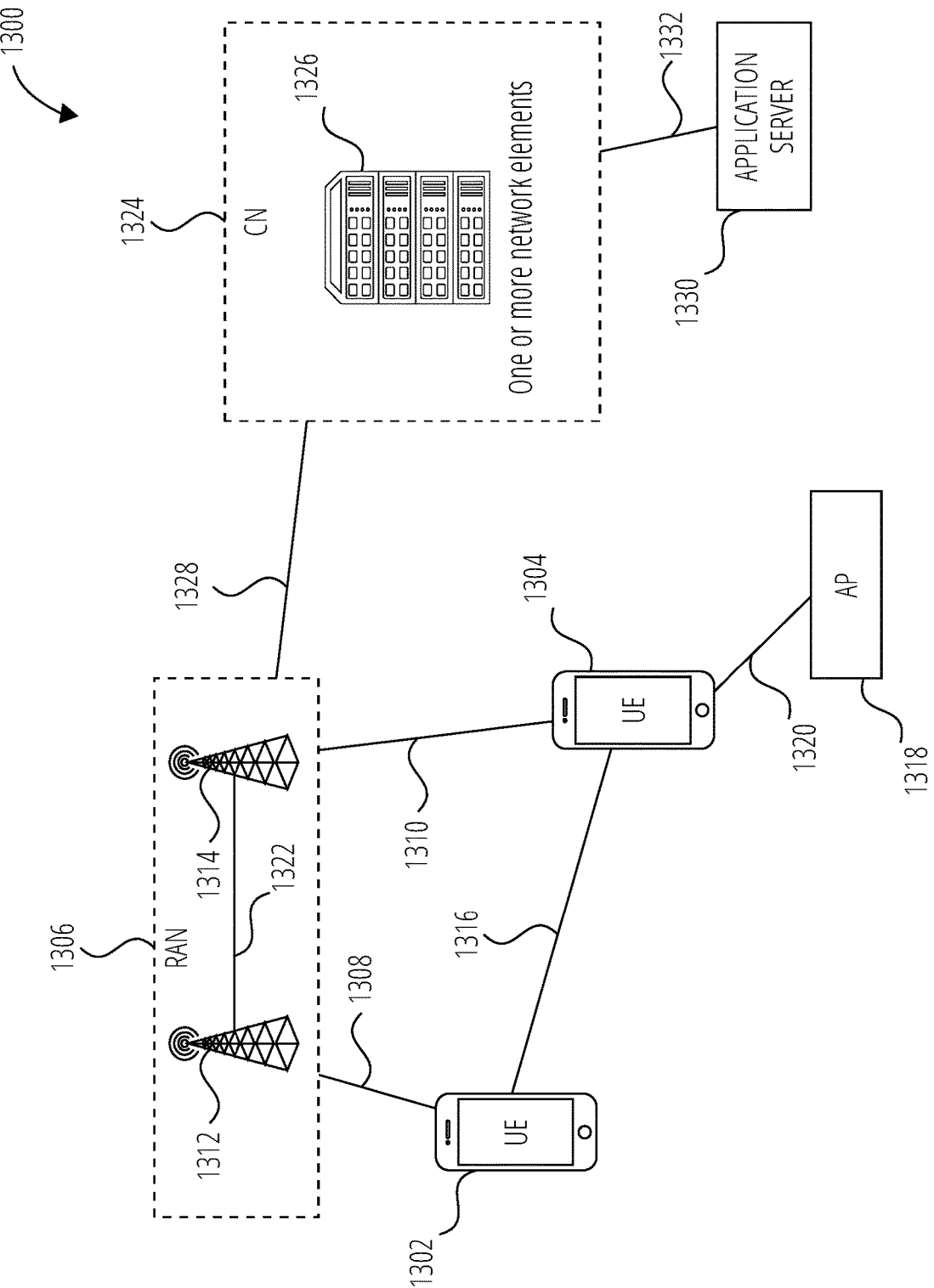
FIG. 13 illustrates an example architecture of a wireless communication system, according to embodiments disclosed herein.

FIG. 13 illustrates an example architecture of a wireless communication system 1300, according to embodiments disclosed herein. The following description is provided for an example wireless communication system 1300 that operates in conjunction with the LTE system standards and/or 5G or NR system standards as provided by 3GPP technical specifications.

As shown by FIG. 13, the wireless communication system 1300 includes UE 1302 and UE 1304 (although any number of UEs may be used). In this example, the UE 1302 and the UE 1304 are illustrated as smartphones (e.g., handheld touchscreen mobile computing devices connectable to one or more cellular networks), but may also comprise any mobile or non-mobile computing device configured for wireless communication.

The UE 1302 and UE 1304 may be configured to communicatively couple with a RAN 1306. In embodiments, the RAN 1306 may be NG-RAN, E-UTRAN, etc. The UE 1302 and UE 1304 utilize connections (or channels) (shown as connection 1308 and connection 1310, respectively) with the RAN 1306, each of which comprises a physical communications interface. The RAN 1306 can include one or more base stations, such as base station 1312 and base station 1314, that enable the connection 1308 and connection 1310.

In this example, the connection 1308 and connection 1310 are air interfaces to enable such communicative coupling, and may be consistent with RAT(s) used by the RAN 1306, such as, for example, an LTE and/or NR.

In some embodiments, the UE 1302 and UE 1304 may also directly exchange communication data via a sidelink interface 1316. The UE 1304 is shown to be configured to access an access point (shown as AP 1318) via connection 1320. By way of example, the connection 1320 can comprise a local wireless connection, such as a connection consistent with any IEEE 802.11 protocol, wherein the AP 1318 may comprise a Wi-Fi® router. In this example, the AP 1318 may be connected to another network (for example, the Internet) without going through a CN 1324.

In embodiments, the UE 1302 and UE 1304 can be configured to communicate using orthogonal frequency division multiplexing (OFDM) communication signals with each other or with the base station 1312 and/or the base station 1314 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1312 or base station 1314 may be implemented as one or more software entities running on server computers as part of a virtual network. In addition, or in other embodiments, the base station 1312 or base station 1314 may be configured to communicate with one another via interface 1322. In embodiments where the wireless communication system 1300 is an LTE system (e.g., when the CN 1324 is an EPC), the interface 1322 may be an X2 interface. The X2 interface may be defined between two or more base stations (e.g., two or more eNBs and the like) that connect to an EPC, and/or between two eNBs connecting to the EPC. In embodiments where the wireless communication system 1300 is an NR system (e.g., when CN 1324 is a 5GC), the interface 1322 may be an Xn interface. The Xn interface is defined between two or more base stations (e.g., two or more gNBs and the like) that connect to 5GC, between a base station 1312 (e.g., a gNB) connecting to 5GC and an eNB, and/or between two eNBs connecting to 5GC (e.g., CN 1324).

The RAN 1306 is shown to be communicatively coupled to the CN 1324. The CN 1324 may comprise one or more network elements 1326, which are configured to offer various data and telecommunications services to customers/subscribers (e.g., users of UE 1302 and UE 1304) who are connected to the CN 1324 via the RAN 1306. The components of the CN 1324 may be implemented in one physical device or separate physical devices including components to read and execute instructions from a machine-readable or computer-readable medium (e.g., a non-transitory machine-readable storage medium).

In embodiments, the CN 1324 may be an EPC, and the RAN 1306 may be connected with the CN 1324 via an S1 interface 1328. In embodiments, the S1 interface 1328 may be split into two parts, an S1 user plane (S1-U) interface, which carries traffic data between the base station 1312 or base station 1314 and a serving gateway (S-GW), and the S1-MME interface, which is a signaling interface between the base station 1312 or base station 1314 and mobility management entities (MMEs).

In embodiments, the CN 1324 may be a 5GC, and the RAN 1306 may be connected with the CN 1324 via an NG interface 1328. In embodiments, the NG interface 1328 may be split into two parts, an NG user plane (NG-U) interface, which carries traffic data between the base station 1312 or base station 1314 and a user plane function (UPF), and the S1 control plane (NG-C) interface, which is a signaling interface between the base station 1312 or base station 1314 and access and mobility management functions (AMFs).

Generally, an application server 1330 may be an element offering applications that use internet protocol (IP) bearer resources with the CN 1324 (e.g., packet switched data services). The application server 1330 can also be configured to support one or more communication services (e.g., VoIP sessions, group communication sessions, etc.) for the UE 1302 and UE 1304 via the CN 1324. The application server 1330 may communicate with the CN 1324 through an IP communications interface 1332.

Figure 14:
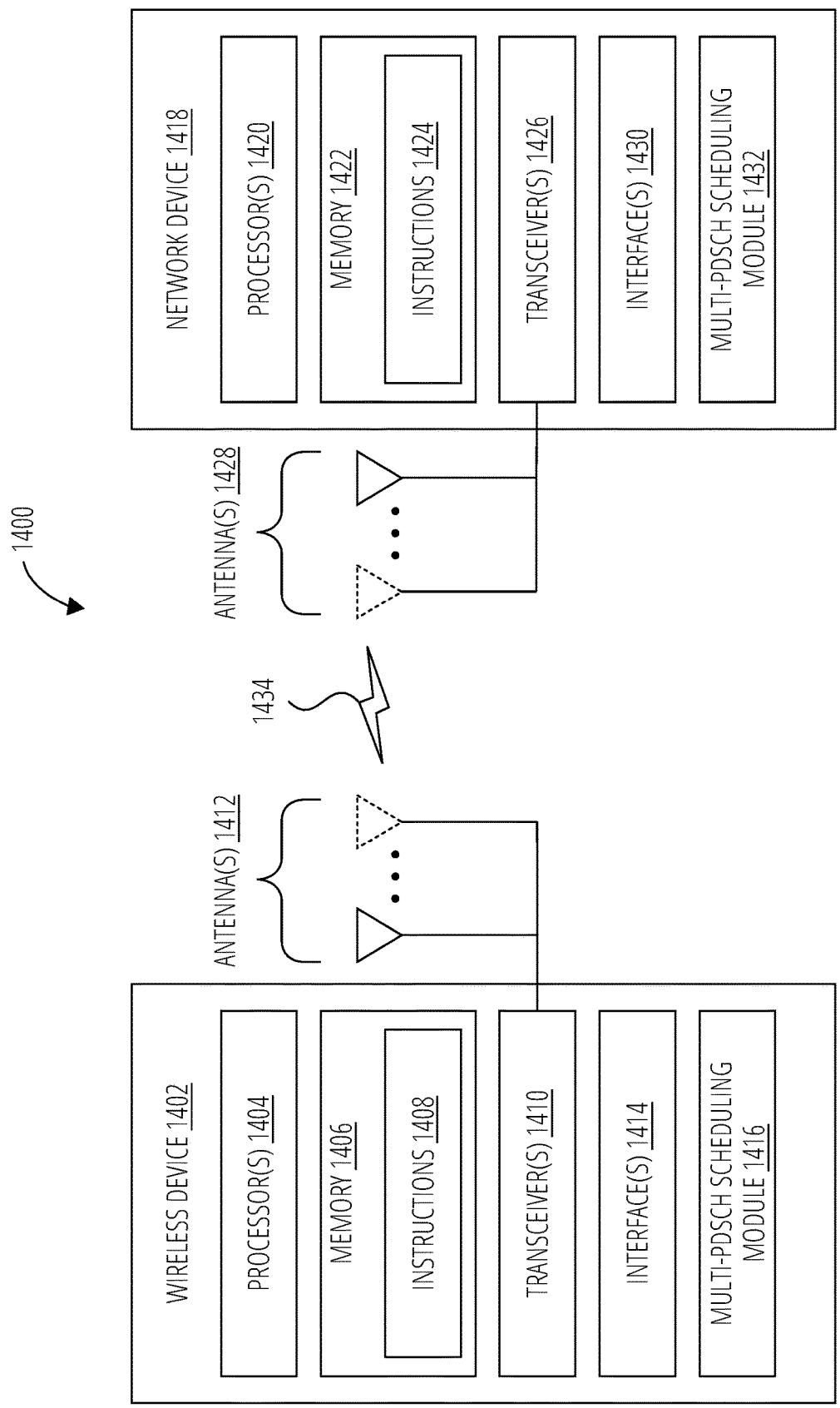
FIG. 14 illustrates a system for performing signaling between a wireless device and a network device, according to embodiments disclosed herein.

FIG. 14 illustrates a system 1400 for performing signaling 1434 between a wireless device 1402 and a network device 1418, according to embodiments disclosed herein. The system 1400 may be a portion of a wireless communications system as herein described. The wireless device 1402 may be, for example, a UE of a wireless communication system. The network device 1418 may be, for example, a base station (e.g., an eNB or a gNB) of a wireless communication system.

The wireless device 1402 may include one or more processor(s) 1404. The processor(s) 1404 may execute instructions such that various operations of the wireless device 1402 are performed, as described herein. The processor(s) 1404 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1402 may include a memory 1406. The memory 1406 may be a non-transitory computer-readable storage medium that stores instructions 1408 (which may include, for example, the instructions being executed by the processor(s) 1404). The instructions 1408 may also be referred to as program code or a computer program. The memory 1406 may also store data used by, and results computed by, the processor(s) 1404.

The wireless device 1402 may include one or more transceiver(s) 1410 that may include radio frequency (RF) transmitter and/or receiver circuitry that use the antenna(s) 1412 of the wireless device 1402 to facilitate signaling (e.g., the signaling 1434) to and/or from the wireless device 1402 with other devices (e.g., the network device 1418) according to corresponding RATs.

The wireless device 1402 may include one or more antenna(s) 1412 (e.g., one, two, four, or more). For embodiments with multiple antenna(s) 1412, the wireless device 1402 may leverage the spatial diversity of such multiple antenna(s) 1412 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1402 may be accomplished according to precoding (or digital beamforming) that is applied at the wireless device 1402 that multiplexes the data streams across the antenna(s) 1412 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1402 may implement analog beamforming techniques, whereby phases of the signals sent by the antenna(s) 1412 are relatively adjusted such that the (joint) transmission of the antenna(s) 1412 can be directed (this is sometimes referred to as beam steering).

The wireless device 1402 may include one or more interface(s) 1414. The interface(s) 1414 may be used to provide input to or output from the wireless device 1402. For example, a wireless device 1402 that is a UE may include interface(s) 1414 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver (s) 1410/antenna(s) 1412 already described) that allow for communication between the UE and other devices and may operate according to known protocols (e.g., Wi-Fi®, Bluetooth®, and the like).

The wireless device 1402 may include a multi-PDSCH scheduling module 1416. The multi-PDSCH scheduling module 1416 may be implemented via hardware, software, or combinations thereof. For example, the multi-PDSCH scheduling module 1416 may be implemented as a processor, circuit, and/or instructions 1408 stored in the memory 1406 and executed by the processor(s) 1404. In some examples, the multi-PDSCH scheduling module 1416 may be integrated within the processor(s) 1404 and/or the transceiver(s) 1410. For example, the multi-PDSCH scheduling module 1416 may be implemented by a combination of software components (e.g., executed by a DSP or a general processor) and hardware components (e.g., logic gates and circuitry) within the processor(s) 1404 or the transceiver(s) 1410.

The multi-PDSCH scheduling module 1416 may be used for various aspects of the present disclosure, for example, aspects of FIG. 3 through FIG. 12. For example, the multi-PDSCH scheduling module 1416 is configured to determine candidate PDSCH reception occasions using a TDRA table, and generate HARQ-ACK codebooks (and provide corresponding ACK/NACK signaling to a base station) in the manner described in various embodiments herein.

The network device 1418 may include one or more processor(s) 1420. The processor(s) 1420 may execute instructions such that various operations of the network device 1418 are performed, as described herein. The processor(s) 1420 may include one or more baseband processors implemented using, for example, a CPU, a DSP, an ASIC, a controller, an FPGA device, another hardware device, a firmware device, or any combination thereof configured to perform the operations described herein.

The network device 1418 may include a memory 1422. The memory 1422 may be a non-transitory computer-readable storage medium that stores instructions 1424 (which may include, for example, the instructions being executed by the processor(s) 1420). The instructions 1424 may also be referred to as program code or a computer program. The memory 1422 may also store data used by, and results computed by, the processor(s) 1420.

The network device 1418 may include one or more transceiver(s) 1426 that may include RF transmitter and/or receiver circuitry that use the antenna(s) 1428 of the network device 1418 to facilitate signaling (e.g., the signaling 1434) to and/or from the network device 1418 with other devices (e.g., the wireless device 1402) according to corresponding RATs.

The network device 1418 may include one or more antenna(s) 1428 (e.g., one, two, four, or more). In embodiments having multiple antenna(s) 1428, the network device 1418 may perform MIMO, digital beamforming, analog beamforming, beam steering, etc., as has been described.

The network device 1418 may include one or more interface(s) 1430. The interface(s) 1430 may be used to provide input to or output from the network device 1418. For example, a network device 1418 that is a base station may include interface(s) 1430 made up of transmitters, receivers, and other circuitry (e.g., other than the transceiver(s) 1426/antenna(s) 1428 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1418 may include a multi-PDSCH scheduling module 1432. The multi-PDSCH scheduling module 1432 may be implemented via hardware, software, or combinations thereof. For example, the multi-PDSCH scheduling module 1432 may be implemented as a processor, circuit, and/or instructions 1424 stored in the memory 1422 and executed by the processor(s) 1420. In some examples, the multi-PDSCH scheduling module 1432 may be integrated within the processor(s) 1420 and/or the transceiver(s) 1426. For example, the multi-PDSCH scheduling module 1432 may be implemented by a combination of software components (e.g., executed by a DSP or a general processor) and hardware components (e.g., logic gates and circuitry) within the processor(s) 1420 or the transceiver(s) 1426.

The multi-PDSCH scheduling module 1432 may be used for various aspects of the present disclosure, for example, aspects of FIG. 3 through FIG. 12. For example, the multi-PDSCH scheduling module 1432 is configured to generate a DCI scheduling a multi-PDSCH for transmission to a UE, to generate a multi-PDSCH according to that scheduling, and to process ACK/NACK signaling (e.g., according to a HARQ-ACK codebook) received in a PUCCH from the UE.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for wireless communications by a user equipment (UE), the method comprising:
   receiving, from a base station, downlink control information (DCI) scheduling multiple physical downlink shared channel (PDSCH) transmissions;
   determining a set of candidate PDSCH reception occasions based at least in part on a time domain resource allocation (TDRA) table comprising at least one row with multiple start and length indicator value (SLIV) indexes;

receiving, from the base station, an indication of an invalid symbol of a first candidate PDSCH reception occasion of the set of candidate PDSCH reception occasions that is derived from a row r in the TDRA table;

generating a hybrid automatic repeat request acknowledgement (HARQ-ACK) codebook based on the set of candidate PDSCH reception occasions and according to the indication of the invalid symbol; and providing acknowledgment/negative acknowledgement (ACK/NACK) feedback to the base station according to the HARQ-ACK codebook.

2. The method of claim 1, wherein receiving the indication of the invalid symbol comprises receiving time division duplexing-uplink-downlink-configuration (tdd-UL-DL-Configuration) signaling indicating that the invalid symbol is set to uplink (UL).

3. The method of claim 1, wherein receiving the indication of the invalid symbol comprises receiving an invalid symbol pattern configuration indicating that the invalid symbol is not useable for DL.

4. The method of claim 1 wherein generating the HARQ-ACK codebook comprises removing the first PDSCH reception occasion of the set of candidate PDSCH reception occasions from the set of candidate PDSCH reception occasions prior to generating the HARQ-ACK codebook.

5. The method of claim 1, further comprising receiving a PDSCH that has been rate-matched around the invalid symbol in the first PDSCH reception occasion of the set of candidate PDSCH reception occasions.

6. The method of claim 1, further comprising removing all indications in the HARQ-ACK codebook corresponding to the set of candidate PDSCH reception occasions from the HARQ-ACK codebook.

7. The method of claim 1, further comprising setting a portion of the ACK/NACK feedback corresponding to the first PDSCH reception occasion of the set of candidate PDSCH reception occasions to NACK.

8. A method for wireless communications by a user equipment (UE), the method comprising:

receiving, from a base station, downlink control information (DCI) scheduling multiple physical downlink shared channel (PDSCH) transmissions, wherein the DCI comprises one or more rate matching indicators for the multiple PDSCH transmissions;

determining a set of candidate PDSCH reception occasions based at least in part on a time domain resource allocation (TDRA) table comprising at least one row with multiple start and length indicator value (SLIV) indexes;

generating a hybrid automatic repeat request acknowledgement (HARQ-ACK) codebook based on the set of candidate PDSCH reception occasions;

providing acknowledgment/negative acknowledgement (ACK/NACK) feedback to the base station according to the HARQ-ACK codebook; and receiving, from the base station, an indication of a duration of the multiple PDSCH transmissions, wherein the one or more rate matching indicators comprises a rate matching indicator corresponding to reserved resources for the duration of the multiple PDSCH transmissions.

9. The method of claim 8, wherein the one or more rate matching (Original) indicators comprises a single rate matching indicator that is applicable to each of the multiple PDSCH transmissions.

10. The method of claim 8, wherein the one or more rate matching indicators comprises a plurality of rate matching indicators corresponding to respective PDSCHs of the multiple PDSCH transmissions.

11. The method of claim 10, wherein the plurality of rate matching indicators each comprises a single bit.

12. The method of claim 8, wherein the indication of the duration comprises a symbols in resource block field defining a maximum number of slots based on a maximum number of PDSCHs scheduled by the DCI.

13. The method of claim 8, wherein the indication of the duration comprises a symbols in resource block field defining a maximum number of slots based on subcarrier spacing (SCS) scaling.

14. The method of claim 8, wherein the indication of the duration comprises a symbols in resource block field defining a subset of values.

15. The method of claim 8, wherein the indication of the duration comprises a periodicity and pattern parameter set to 40 bits for 120 kilohertz (kHz) and set up to 320 bits for 960 kHz.

16. A method for wireless communications by a user equipment (UE), the method comprising:

receiving, from a base station, downlink control information (DCI) scheduling multiple physical downlink shared channel (PDSCH) transmissions;

determining a set of candidate PDSCH reception occasions based at least in part on a time domain resource allocation (TDRA) table comprising at least one row with multiple start and length indicator value (SLIV) indexes;

generating a hybrid automatic repeat request acknowledgement (HARQ-ACK) codebook based on the set of candidate PDSCH reception occasions;

performing a bandwidth part (BWP) change on a serving cell of the UE after receiving the DCI; and providing acknowledgment/negative acknowledgement (ACK/NACK) feedback to the base station according to the HARQ-ACK codebook after performing the BWP change.

17. The method of claim 16, wherein the BWP change is one of a maximum number and type of BWP changes that is based on UE capability information.

18. The method of claim 16, further comprising sending, from the UE to the base station, the ACK/NACK feedback assuming that all HARQ-ACK bits of the HARQ-ACK codebook correspond to a current BWP, wherein for a change in subcarrier spacing (SCS) a duration of a K1 value is at least the same as a previous K1 value of a previous BWP, wherein the K1 value corresponds to an offset between a PDSCH occasion and a physical uplink control channel (PUCCH) comprising the HARQ-ACK codebook.

19. The method of claim 16, further comprising sending, from the UE to the base station, first HARQ-ACK bits for effective k1 values after the BWP change, wherein the effective k1 values correspond to respective offsets between PDSCH occasions and a physical uplink control channel (PUCCH) comprising the HARQ-ACK codebook.

20. The method of claim 19, further comprising sending, from the UE to the base station, second HARQ-ACK bits for other k1 values before the BWP change in the PUCCH configured before the BWP change.

\* \* \* \* \*